(12) United States Patent
Kumaran et al.

(10) Patent No.: US 8,655,709 B2
(45) Date of Patent: Feb. 18, 2014

(54) METHOD AND SYSTEM FOR PROCESS BROKERING AND CONTENT INTEGRATION FOR COLLABORATIVE BUSINESS PROCESS MANAGEMENT

(75) Inventors: Santhosh Kumaran, Croton On Hudson, NY (US); Prabir Nandi, Smyrna, GA (US); Kumar Bhaskaran, Englewood, NJ (US)

(73) Assignee: International Business Machines Corporation, Armonk, NY (US)

( * ) Notice: Subject to any disclaimer, the term of this patent is extended or adjusted under 35 U.S.C. 154(b) by 1043 days.

(21) Appl. No.: 12/212,830

(22) Filed: Sep. 18, 2008

(65) Prior Publication Data
US 2009/0024514 A1    Jan. 22, 2009

Related U.S. Application Data

(62) Division of application No. 10/068,339, filed on Feb. 7, 2002, now abandoned.

(51) Int. Cl.
*G06Q 10/00* (2012.01)
(52) U.S. Cl.
USPC ............................................ 705/7.36; 705/37
(58) Field of Classification Search
USPC ............... 705/7–12, 7.11, 7.12, 7.37, 7.36
See application file for complete search history.

(56) References Cited

U.S. PATENT DOCUMENTS 6,237,011 B1 *   5/2001   Ferguson et al. ............. 715/234
6,415,373 B1 *   7/2002   Peters et al. .................. 711/167

| | | |
|---|---|---|
| 2002/0010741 A1 | 1/2002 | Stewart et al. |
| 2002/0016725 A1 | 2/2002 | Eichstaedt et al. |
| 2002/0019797 A1 | 2/2002 | Stewart et al. |
| 2002/0077919 A1 | 6/2002 | Lin et al. |
| 2002/0099580 A1 | 7/2002 | Eicher et al. |
| 2002/0184070 A1 * | 12/2002 | Chen et al. ........................ 705/9 |

OTHER PUBLICATIONS

AdaptingContent—client resources in the Internet—by Mohan, R.; Smith, J. R. and Chung-Sheng Li; IBM Thomas J.Watson Research Center, Yorktown Heights, NY, USA; This paper appears in: Multimedia Computing and Systems, 1999, IEEE International. Publication Date: Jul. 1999 vol. 1, on pp. 302-303 vol. 1.*

Seeberg, Cornelia; El Saddik, Abdulmotaleb; Steinacker, Achim; Reichenberger, Klaus; Fischer, Stephan; Steinmetz, Ralf; "From the User's Needs to Adaptive Documents", In Proceedings of the Integrated Design & Process Technology, 2000.

* cited by examiner

*Primary Examiner* — Andre Boyce
*Assistant Examiner* — Ernest A Jackson
(74) *Attorney, Agent, or Firm* — Matthew W. Baca; Jack V. Musgrove

(57) ABSTRACT

Process Brokering Services (PBS) are implemented though the concept of Adaptive Documents to facilitate electronic commerce (e-commerce). PBS provides a single point of process control over the various fragmented execution flows and brings together the elements for process integration (views, content, flows) in a unified, scalable architecture on an industry standard platform. The two principal functions of the PBS are brokering of multiple business processes encapsulated in various back-end systems including workflow engines and business applications, and aggregating content from multiple enterprise information systems in the business context and managing the shared access to this based on the roles of the participants. The dynamic services provided by PBS are accessible to clients through the PBS Interface.

5 Claims, 19 Drawing Sheets

METHOD AND SYSTEM FOR PROCESS BROKERING AND CONTENT INTEGRATION FOR COLLABORATIVE BUSINESS PROCESS MANAGEMENT

REFERENCE TO RELATED APPLICATION

This application is a divisional of U.S. patent application Ser. No. 10/068,339 filed Feb. 7, 2002 now abandoned.

BACKGROUND OF THE INVENTION

1. Field of the Invention

The present invention generally relates to business process management and integration and, more particularly, to a Process Brokering Services (PBS) through the concept of Adaptive Documents to facilitate collaborative business process management and integration.

2. Background Description

Across every industry, large organizations are struggling with the complexity of integrating both internal and external systems. Potential benefits to companies that can successfully address these challenges include:

Gaining better control of their value chain and leveraging this improved control for competitive advantage.

Reducing inventory costs by improving their process integration with suppliers.

Providing a consistent customer experience across a range of channels and thereby improving customer loyalty.

Realizing the benefits of a recent merger through effective communications across diverse systems.

Traditional business process integration is usually performed by defining isolated work flows executed by a workflow engine. This approach is inadequate in the new Web-based business models where several enterprises collaborate to achieve business objectives. The emphasis in this new business model is on solution assembly in which new solutions are built by leveraging the existing applications. These new solutions need design patterns that can bring together information integration and process integration. These solutions need to manage and choreograph fragmented processes and information distributed among several enterprises and applications. The invention described here addresses these issues.

SUMMARY OF THE INVENTION

According to the invention, there is provided Process Broker Services (PBS) which provides a single point of process control over the various fragmented execution flows and brings together the elements for process integration (views, content, flows) in a unified, scalable architecture on an industry standard platform. The two principal functions of the PBS are brokering of multiple business processes encapsulated in various back-end systems including workflow engines and business applications, and aggregating content from multiple enterprise information systems in the business context and managing the shared access to this based on the roles of the participants.

The PBS enables e-business solution assembly. The solution assembly typically involves the following steps:

Supplying the business process definitions,

Composing the relevant Adaptive Documents (ADOCs) for business collaboration which involves specifying the valid application states for the aggregated content and the business rules for orchestrating the state transitions, Formulating the necessary business objects that are referenced from the ADOCs, Generating the relevant application adapters to communicate with back-end systems using messages to represent business data, Defining the relevant set of messages, and Assembling the integrated user experience through sequencing of ACOC views that render role-based content driven by application/process/user events and the ensuing invocation of dynamic ADOC business services—the ADOC choreographs the collaboration of various back-end systems in the context of the business process to supply the content.

Solution design begins with laying out the information model, the organization model, and the business process model. Using the information model and the business process model, we identify the ADOCs in the system. Using the business events and their prerequisites, we design the ADOC state machines. Using the processing rules associated with these business events, we identify the commands that need to be executed as part of state transitions. When processing rules dictate collaboration with user or software agents in the system, we use macro flows to define them. Macro flows are directed graphs that establish the relationships between activities that correspond to the nodes in these graphs. We use activity controllers to define the micro flow used to complete these activities. Activity controllers are designed and defined the same way as ADOC controllers are handled. We use a state machine to model their behavior and use commands to effect the behavior.

The dynamic services provided by PBS are accessible to clients through a single PBS interface. These business services can be categorized as Process Brokering, ADOC Query, ADOC Lifecycle Management, and Scheduling Service. The Process Brokering Service allows PBS clients to invoke dynamic business services that are made available based on the business state of the ADOC and the execution state of the associated work flows—the services are dynamic because they are state dependent, i.e., the available set of services vary with any change in the business state of the ADOC instances. The client can trigger any service by raising an event against a specific ADOC instance. The actual invocation of the service is made by a service request on the PBS with the ADOC identification (ID), the business event name, and other parameters. The ADOC Query Service allows PBS clients to query the business state of the ADOC, ascertain the available business services for a given business state, access the business content aggregated by the ADOC, and query for navigational purposes such as list of ADOCs that satisfy a given criteria. The ADOC Lifecycle Management Service allows PBS clients to create, delete, archive, and restore ADOCs. The Scheduling Service allows PBS clients to automate the service invocation by scheduling it using the PBS Scheduler. At the scheduled time, the PBS Scheduler notifies the registered Action Listener that in turn makes the service invocation on the PBS. The PBS provides a number of standard Action Listeners and a provision for user-defined Action Listeners.

The PBS interface redirects a business event from a client to the appropriate ADOC. The ADOC controller acts on the business event based on its state and the event content. As part of this action, based on business rules attached to the ADOC, multiple commands get executed. If the execution is successful, the state of the ADOC changes. (It could be that the state transition is a self loop, meaning the start and end states of a transition are one and the same. In other words, state does not have to change in response to a business event.)

The commands are abstractions of the work the ADOC wants to do in response to a business event. A receiver is specified for each command. The receiver does the actual work. A receiver is actually specified as a method to be executed on a target object. The commands and receivers are designed based on well-known "command design pattern".

A special case of a receiver is the workflow engine. More correctly, there is a set of workflow-related receivers, such as "launch a workflow", "claim a workflow activity", "complete a workflow activity", etc. This is treated special since all the active activities belonging to a workflow launched by an ADOC are dynamically bound to that ADOC. This means that access to these activities are controlled by the ADOC. Events to these activities are accepted by the process broker services interface and sent to the appropriate ADOC. The activity controllers that are dynamically bound to the ADOC act on these events much like the ADOC controller does.

All the definitions, including the processes, the state machine, business rules for state transitions, the commands, and the receivers are specified using XML (eXtensible Markup Language). The system reads in the XML files and does the appropriate internal configurations. This leads to a dynamic, adaptive and flexible system.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
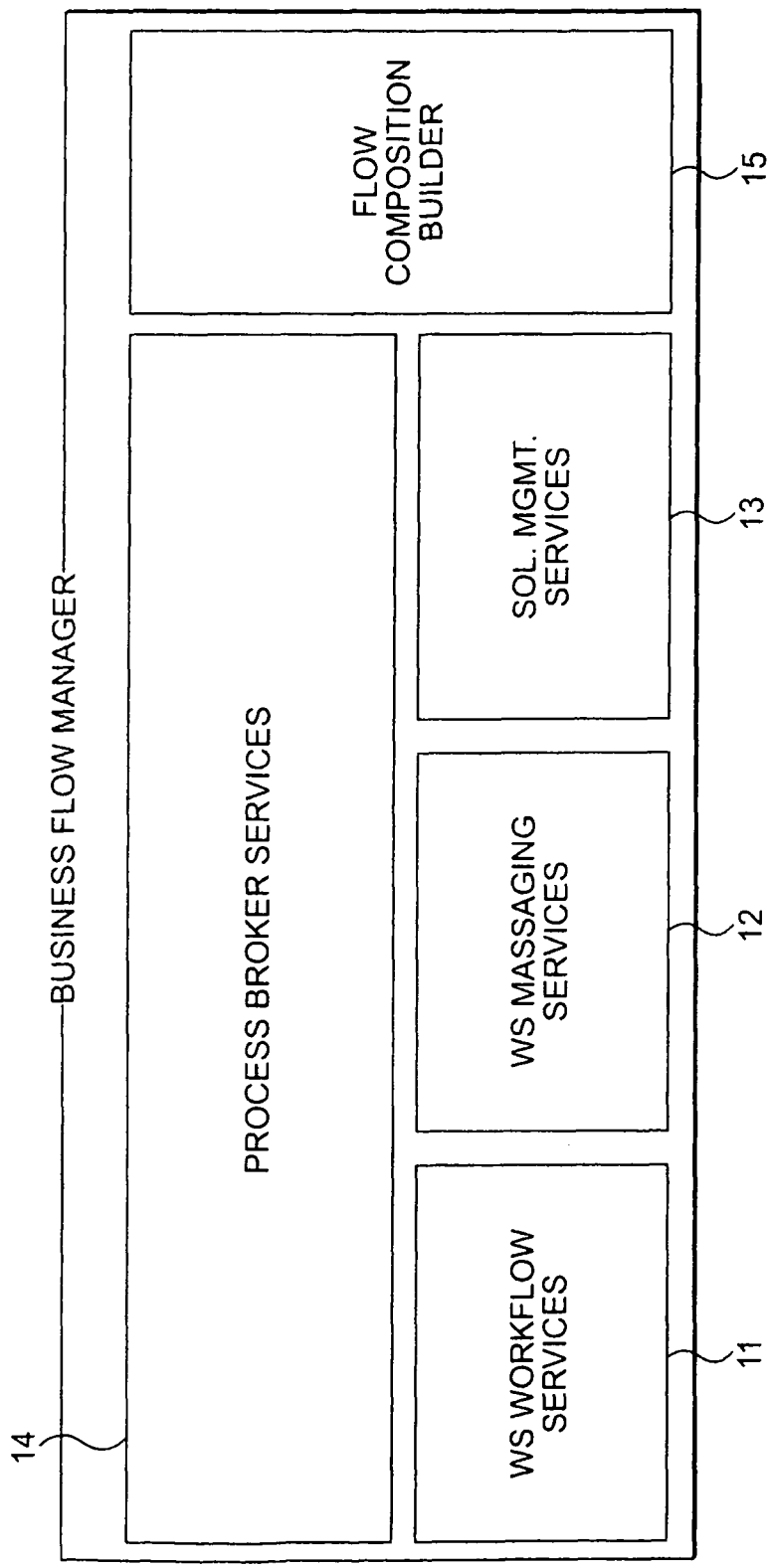
FIG. 1 is a block diagram showing the Business Flow Manager (BFM) components

The Process Broker Services (PBS) is a component of the Business Flow Management (BFM) in WebShpere Business Integrator (WSBI or WBI). (WebSphere is a trademark of International Business Machines Corporation.) The high-level component architecture of the Business Flow Manager is shown in FIG. 1. The components include:

WebSphere Workflow Services (WWFS) 11—Joint Flow based Application Program Interface (API) to access WFMC compliant workflow engines such as the MQ Workflow. (Joint Flow is an Object Management Group standard for accessing workflow facilities, and MQ Workfow is part of a messaging product from IBM.)

WebSphere Messaging Services 12—Java Messenger Service (JMS) Message Listener for asynchronous communication using message queuing that is used for target adapters in the BFM.

Solution Management Services 13—Audit, Exception Handling, and Monitoring of business processes.

Process Broker Services 14—Process Brokering and Content Aggregation Services using ADOC and Controllers for State Management Flow Composition Builder 15—Build time suite of tools for business process management.

The Business Flow Manager (BFM) has four run-time components and one build-time tool. The WWFS 11, the WS Messaging Services 12, and the Solution Management Services 13 are collectively referred to in the ensuing description as the BFM Base. The Process Broker Services (PBS) 14 is therefore a BFM component that is realized on top of the BFM Base, i.e., it uses the services provided by the BFM Base components.

The WWFS 11 base component is primarily used as an interface to the workflow engine such as MQ Workflow. It logs a user to the workflow engine and provides the necessary interfaces for PBS to launch a process, claim an activity, update the activity status upon completion, and query the process and activity details. Logging a user requires that this component interact with the Trust & Access Manager (TAM) to obtain the Global Sign On credentials for the user.

The WebSphere (WS) Messaging Services 12 base component enables applications and other BFM clients to communicate to BFM via messaging (i.e., MQ). The JMS Listener, upon receipt of a message, spawns the message-driven bean in WebSphere that in turn invokes the PBS where the business data in the message is used for process brokering.

The Solution Management Services 13 uses the Solution Manager (WBI Component) client for audit and exception logging. The logs are marked with a unique transaction identifier such as the ADOC id that is then used for correlating the related logs. The Solution Manager console rendered by the Interaction Manager (WBI Component) is used to view the logs generated by the BFM.

The Flow Composition Builder 15 serves as the build time tool for the BFM. The Flow Composition Builder is used to build micro-flows, i.e., a sequencing of an ensemble of commands. A command can be as simple as a method call on a business object. These micro-flows are then invoked from within the PBS 14. The micro-flows can be viewed as a mechanism used by ADOCs in the PBS 14 to aggregate content from multiple enterprise-information-systems or data sources.

Figure 2:
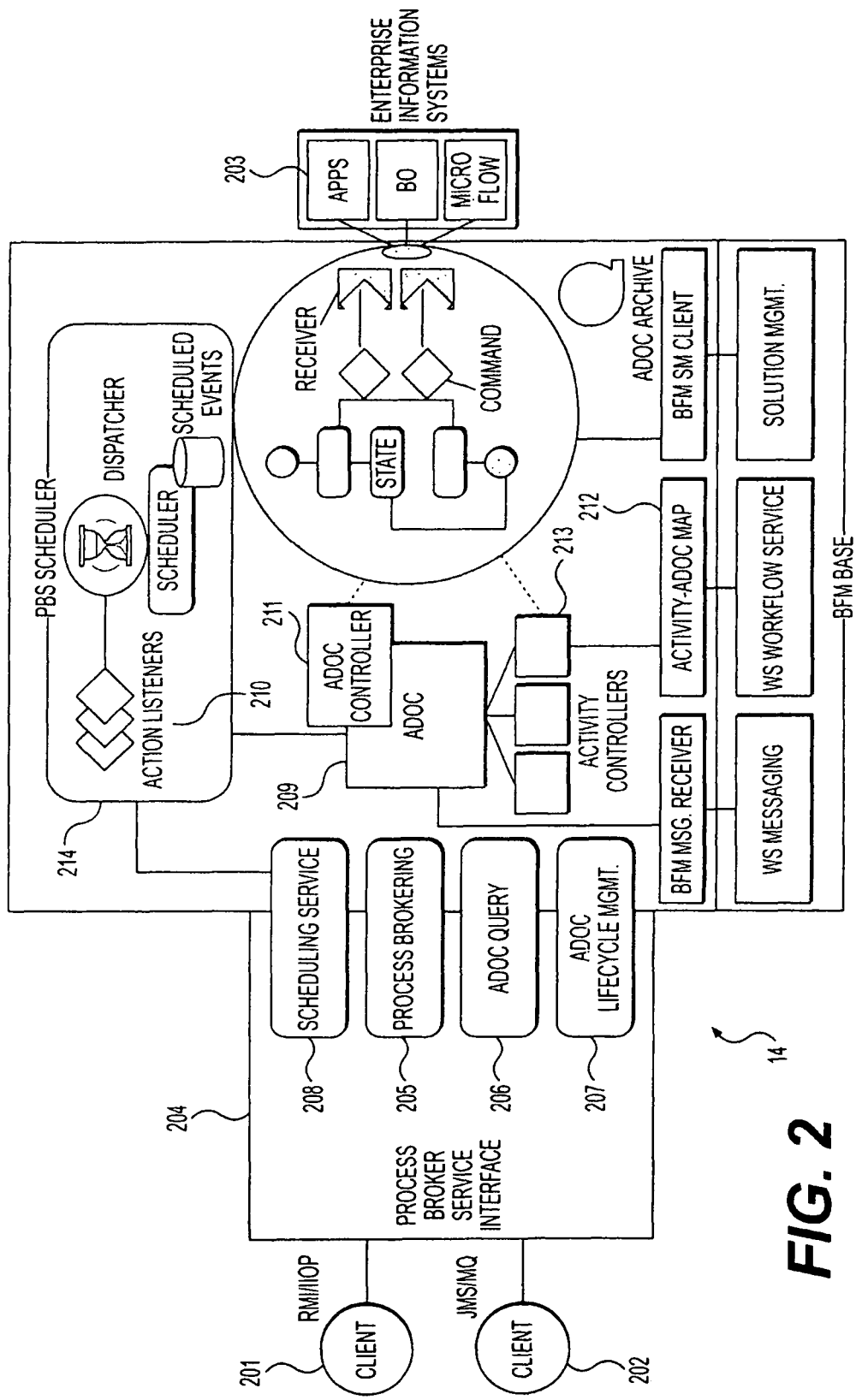
FIG. 2 is a block diagram showing the architecture of an implementation of the Process Broker Services (PBS) according to the invention.

The PBS Architecture is shown in FIG. 2. Clients 201 and 202 to the PBS can use either Remote Method Invocation/Internet Inter Orb (Object Request Broker) Protocol (RMI/IIOP) or JMS/MQ protocols to communicate with the PBS. For example, the Interaction Manager is a PBS client that uses RMI/IIOP to communicate with the PBS to render the dynamic executable content from ADOCs to users who are interacting via Web browsers. On the other hand an end-point application can use MQ to send messages such as the OAG-BOD to the PBS. (OAG-BOD2 is Open Application Group's Business Object Documents—an XML application-to-application messaging standard.)

PBS also uses both RMJ/IIOP and MQ to communicate to the various enterprise information systems ("back-ends") 203. For example, the PBS uses RMI to communicate to the Business Objects (BO) such as a Purchase Order (PO) or a Ship Schedule. The PBS can also use the WS Messaging Services 12 and communicate to the end-points via MQ using OAG-BOD messages. Such messages can be communicated either point-to-point using MQ to endpoints or via the Information Delivery Manager (IDM), a WBI message broker that transforms and routes the messages as warranted. In both the cases, point-to-point and using the IDM, BFM Source Adapters will have to be built using the Flow Composition Builder (also referred to as the MQ Adapter Builder). These source adapters semantically adapt the business data, aggregated by the PBS from various data sources, to business messages that are then communicated to the end-points.

The PBS provides dynamic business services that are accessible to clients through a single PBS interface 204. These business services can be categorized as Process Brokering 205, ADOC Query 206, ADOC Lifecycle Management 207, and Scheduling Service 208 as shown in FIG. 2.

The Process Brokering Service 205 allows PBS clients to invoke dynamic business services that are made available based on the business state of the ADOC 209—the services are dynamic because they are state dependent, i.e., the available set of services vary with any change in the business state of the ADOC instances. The client can trigger any service by raising an event against a specific ADOC instance. The actual invocation of the service is made by a service request on the PBS with the ADOC ID, the business event name, and other parameters.

ADOC Query Service 206 allows PBS clients to query the business state of the ADOC 209, ascertain the available business services for a given business state, access the business content aggregated by the ADOC, and query for navigational purposes such as list of ADOCs that satisfy a given criteria.

ADOC Lifecycle Management Service 207 allows PBS clients to create, delete, archive, and restore ADOCs.

Scheduling Service 208 allows PBS clients to automate the service invocation by scheduling it using the PBS Scheduler. At the scheduled time, the PBS Scheduler notifies the registered Action listener that in turn makes the service invocation on the PBS. The PBS provides a number of standard Action Listeners 210 and a provision for user-defined Action Listeners.

Figure 3:
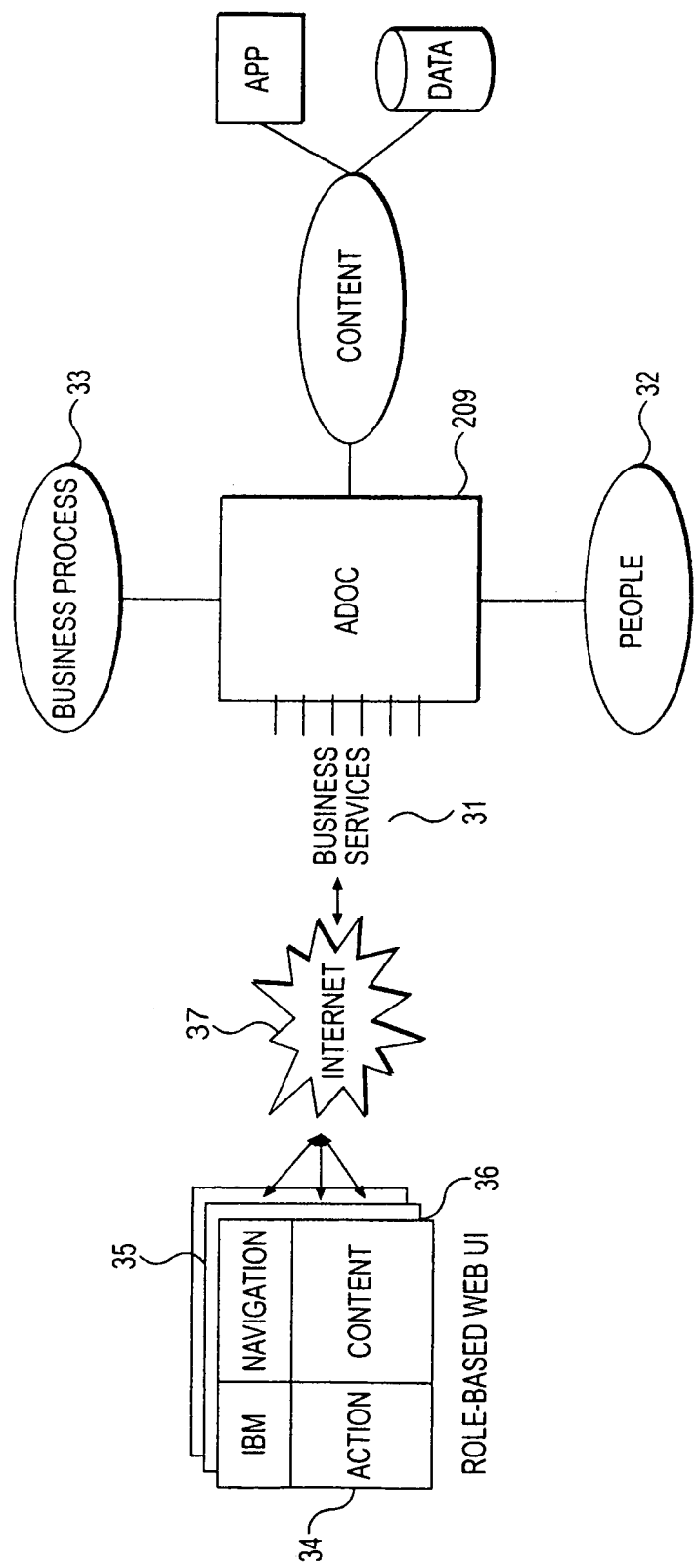
FIG. 3 is a block diagram showing a conceptual view of an Adaptive Document (ADOC)

The Adaptive Document (ADOC) 209 is a component that links the "content" aggregated from various data sources to business processes and people. The ADOC 209 enables collaborative business process management through the orchestration of a variety of applications and user interactions in the context of a business process. FIG. 3 provides a conceptual view of an ADOC.

ADOCs are implemented as Container-Managed Enterprise Java Beans (EJBs). The framework part of the ADOC persists information like the current state, owner and the type of the ADOC, whereas the Solution (viz. RFQ ADOC; PO ADOC, etc.) part inherits from the framework part and persists business object references to data objects.

Consider for example a collaborative forecasting and planning process. The collaborative business process management experience generated by the ADOC is characterized by four concomitant factors:

The ability to share information (e.g., historical sales that is garnered from an Enterprise Resource Planning (ERP) system), The ability to share appropriate decision support tools (e.g., planning engines such as forecasting application whose services are brokered) to act on the information that is shared, The Business Events that define the context in which the information and the tools are shared (e.g., large customer order event that triggers the collaborative planning process), and Enabling collaboration among appropriate role players (e.g., demand planner, supply planner, parts supplier) in the business context using the information and the tools that are aggregated and shared by the ADOC.

The ADOC 209 facilitates the collaborative experience outlined above by dynamically exposing a set of business services 31 based on who you are 32 (i.e., role) and where you are in the process 33 (i.e., process context). Invoking a business service exposed by an ADOC is essentially executing a "business transaction." The ensemble of business transactions in turn constitutes the business conversation. An ADOC can support multiple business conversations that are part of any collaborative business process management.

A business transaction can have multiple levels (e.g., a long running collaborative forecasting process, collaborative planning activity of building a forecast, atomic transaction of getting the sales history of a specific item) and span multiple parties (e.g., two decision makers or applications from different organization units within an enterprise or two decision makers or applications from different enterprises). The ADOC is capable of executing such "multilevel, multi-party business transactions." It is this capability that enables an ADOC to do business process brokering and deliver the right information and right tools, to the right group of people in the context of executing a collaborative business process.

The ADOC can also be understood from the interaction experience of a user in the collaborative solution. Users in this case interact through views of an ADOC. Any particular view has three components—Action 34, Navigation 35, and Content 36 (see FIG. 3).

The Action 34 corresponds to the dynamic business services that are exposed by an ADOC (hinges on the role of the user and the context of the business process) and invoked via the PBS interface.

The Navigation 35 can be either process centric (e.g., show me the set of actions given the current process state) or document centric (e.g., show me the list of ADOCs that require some action). The ADOC supports both navigation models that are once again accessed via the PBS interface.

The Content 36 in the view is marshaled by the execution of the business services in an ADOC, i.e., the business transactions that are brokered by the ADOC Controllers to aggregate the content from a multitude of back-end sources such as applications, business objects, and databases.

The Action 34, Navigation 35 and Content 36 constitute a role-based Web User Interface (UI) through which a client can access the ADOC 209 through the Internet 37.

Referring back to FIG. 2, the ADOC 209 uses the ADOC Controller 211 to implement the brokering functions. A controller is essentially a services broker and is implemented as a state machine, as generally represented by enlarged circle to the right of the controller. When a service request comes to the ADOC 209, it uses the Application State to determine if the request can be entertained, and if so, it uses the controller to broker the services needed to satisfy the request. The design points for the Service Broker or Controller, which is a state machine, are:

1. The state transitions are transactional. All the commands that are triggered by a service request need to be executed as a Logical Unit of Work. If there is a failure, the state change should not occur and if necessary, recovery procedures should be executed (e.g. compensation script).
2. It should be possible to execute an ensemble of commands as part of a state transition. Such an ensemble can be either a simple sequence or wired together as a "micro flow."
3. The controller defines the dynamic behavior of the ADOC. It is possible to modify the definition of the controller, publish it, and hence dynamically change the behavior without disrupting or shutting down the PBS.
4. The Process Broker should facilitate dynamic e-business systems, in which the service providers for the individual commands in the controller can be dynamically mapped. This implies the separation between commands and receivers that implement the commands.
5. The Controller can be self-bootstrapping, i.e., it can schedule triggers that generate service requests on the controller. This is essential to capture timeouts and other temporal constraints that define the dynamic behavior of the service broker.

ADOC-Activity Maps 212 keep track of zero or more workflow activities that the ADOC 209 maybe participating in. The workflow activity implementation in PBS is also modeled in a state machines which is instantiated when the Activity becomes available. The ADOC-Activity maps keep the information of the participating ADOC and the state of the Activity. Using these maps the PBS is able to mediate business events between ADOCs controllers and one or more associated Activity controllers. When the activity is completed the link is deleted and a fresh link is established for the next activity till the process completes. This enables the ADOC to participate in more than one workflow process at a time.

Figure 4:
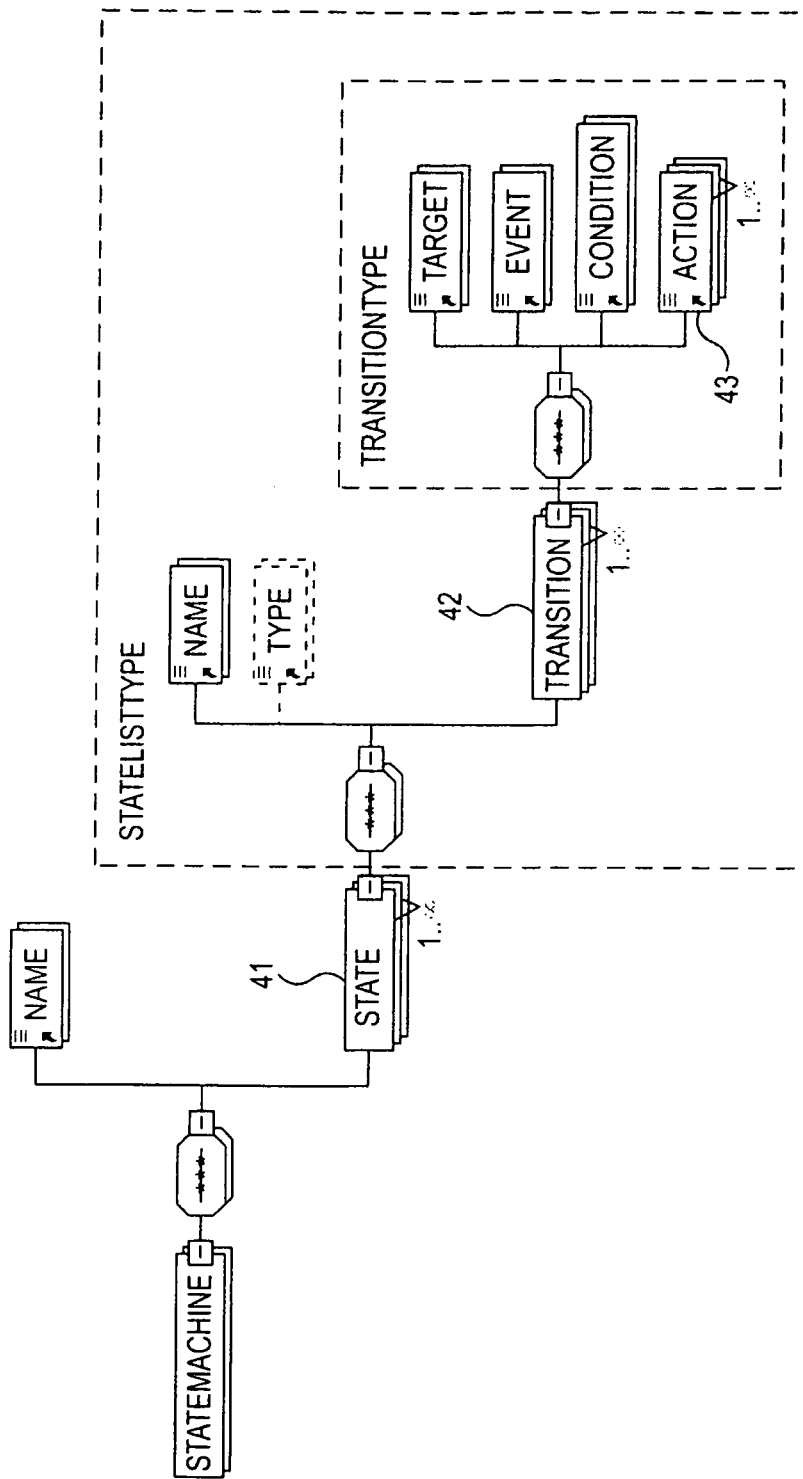
FIG. 4 is a block diagram showing the structure of the Controller.

An ADOC instance has an ADOC Controller 211 and zero or more Activity Controllers 213 based on the association of the ADOC with activities in business processes that are defined in the workflow engine and accessed using the WebSphere Workflow Services 11. Both the ADOC Controller 211 and the Activity Controller 213 have the identical structure as shown in FIG. 4.

The controllers are defined in XML (eXtensible Markup Language) and the PBS reads these definitions at runtime. Changes can be made to the XML definitions at any time, and the PBS will refresh the in-memory definition of the controllers based on the new definitions.

As mentioned previously, the controller is a named state machine. The state machine consists of The list of states 41 that are named and also identified based on their type (e.g., normal, terminal, etc).

The permissible transitions 42 between these states where each transition is specified from a given state to a target state. There can be many transitions from any given state.

The state transitions are triggered for defined events when a given condition expression on the transition is satisfied.

When a state transition occurs, one or more actions 43 or commands are executed. These actions or commands can be sequenced in any fashion and such a sequence of actions is referred to also as a micro-flow.

The business state of an ADOC is a state vector and includes the current state of the ADOC Controller as well as the current states of the Activity Controllers associated with the ADOC.

Figure 5:
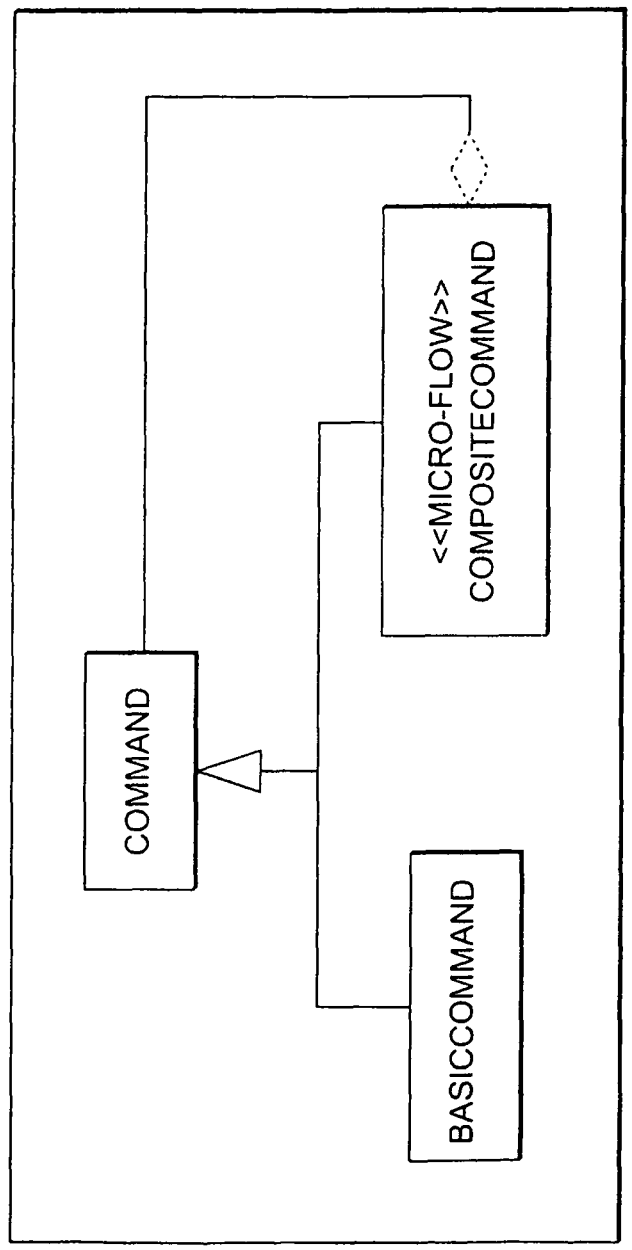
FIG. 5 is a flow diagram showing the logic of the Composite Design Pattern for Commands.

Commands can be viewed as an interface to the business logic, i.e., interface definitions to the various enterprise information systems that are engaged in business process management. Using the composite design pattern, shown in FIG. 5 it is possible to compose commands to form composite-commands or micro-flows. The Flow Composition Builder can be used to sequence commands and construct such micro-flows.

Figure 6:
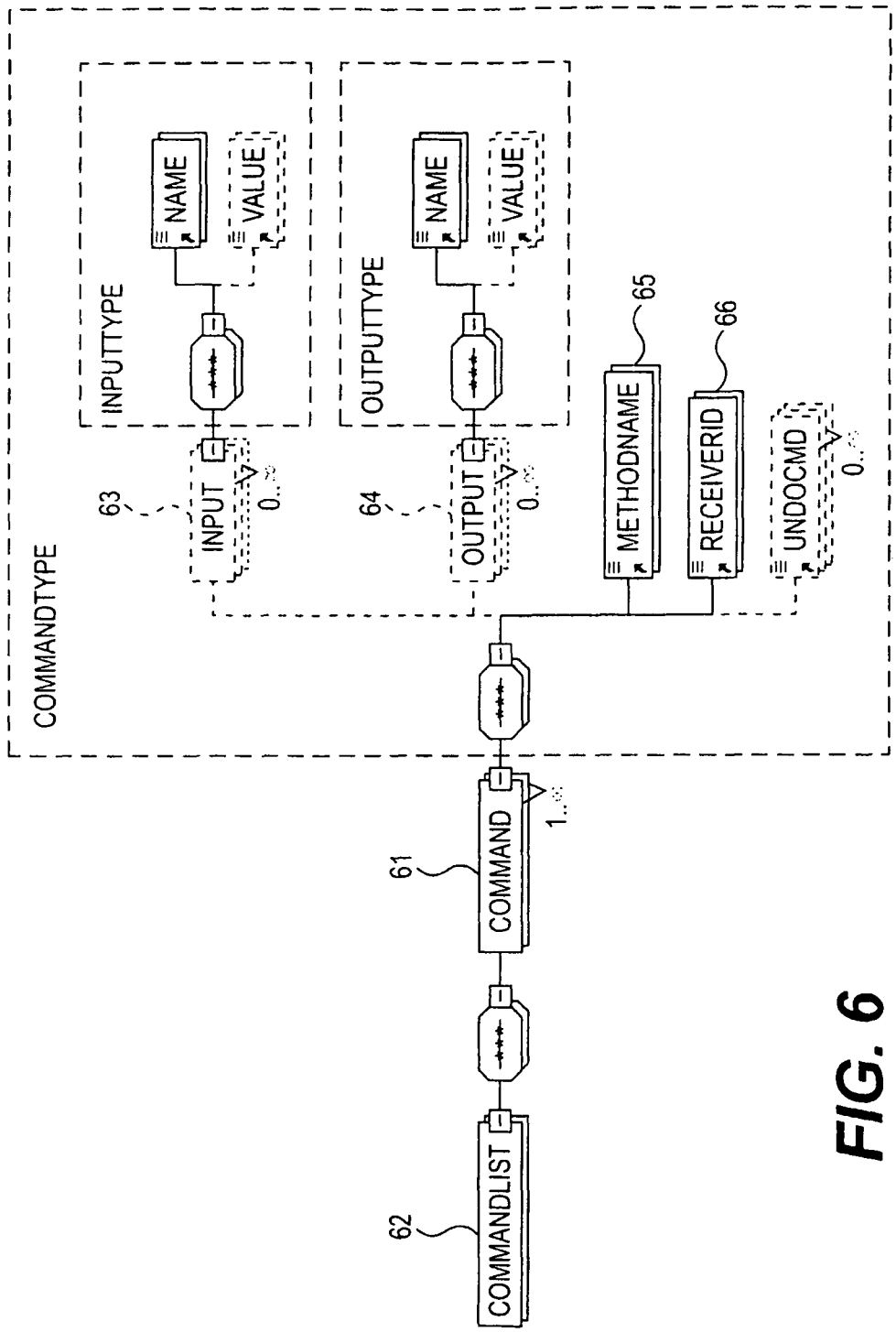
FIG. 6 is a block diagram showing the structure of a Command.

The commands are specified in the controller using XML. The XML command data structure is shown in FIG. 6. Each command 61 in the command list 62 has an input data structure 63 and an output data structure 64 where the individual attributes can be specified as a name-value pair. The command is identified by its method name 65. The commands executed within a state transition are in a single unit of work. In the event of a transaction failure the actions executed by the command(s) are undone using the undo command. Some of the end points that are engaged may not be transactional systems and recovery entails using compensation logic. Such logic can be encapsulated in the undo commands. The receiver 66 associated with a command is identified by the receiver identification (ID).

The receiver is an interface to the service providers, i.e., implementations of the business logic expressed in the commands. Receivers enable the dynamic mapping of the service providers to the commands. There can be many types of receivers such as a JMS receiver for asynchronous connectivity to various back-end applications and systems or a RMJ receiver for synchronous connectivity to other business objects and applications.

The Flow Composition Builder 15 (FIG. 1), used to build the micro-flow, can be used to build specialized receivers that implement the micro-flow. These receivers are realized either as Java objects or Session Beans.

Figure 7:
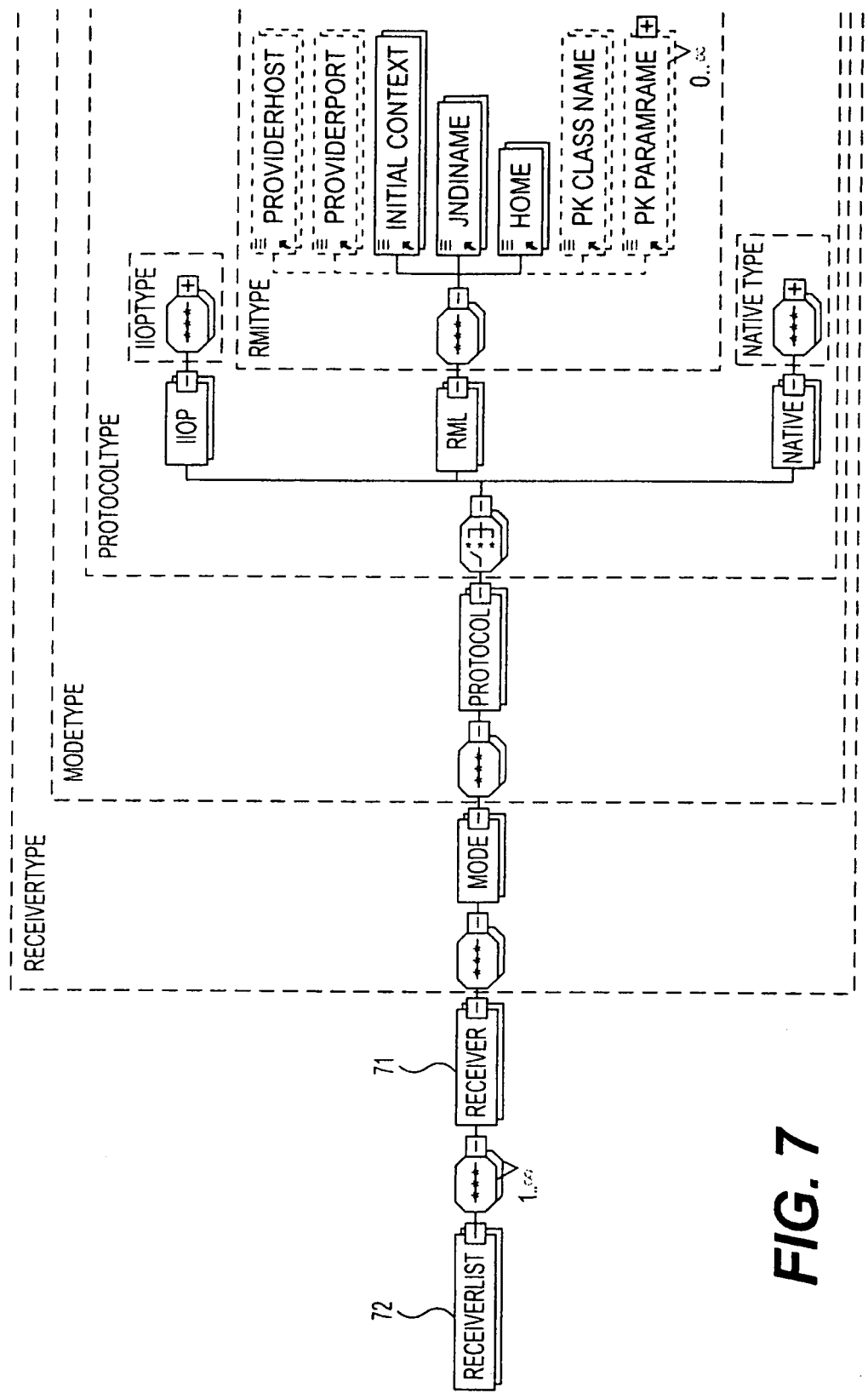
FIG. 7 is a block diagram showing the structure of a Receiver.

The receivers in the PBS are specified using XML. The structure of the receiver is shown in FIG. 7.

Identifying the protocol type and the relevant parameters for establishing the connectivity and invoking the method name specifies the receiver 71 in the receiver list 72. The RMI protocol is used to identify the Java class that is instantiated in a different Java Virtual Machine (JVM) than the PBS. The native protocol is used when the Java class that is engaged is in the same JVM as the PBS. Receivers can be added with other protocols such as JMS and IIOP.

Referring back to FIG. 2, the Process Broker Services Scheduler 214 enables time phased automatic invocation of service requests. This provides the ability for an ADOC 209 and its associated controllers to be self-bootstrapping, i.e., the ability to trigger events automatically to drive the state transitions. Such a capability is very useful in modeling timeout events for example—in this case the timeout event is scheduled by a command in a controller and the event is triggered on schedule on the controller.

Figure 8:
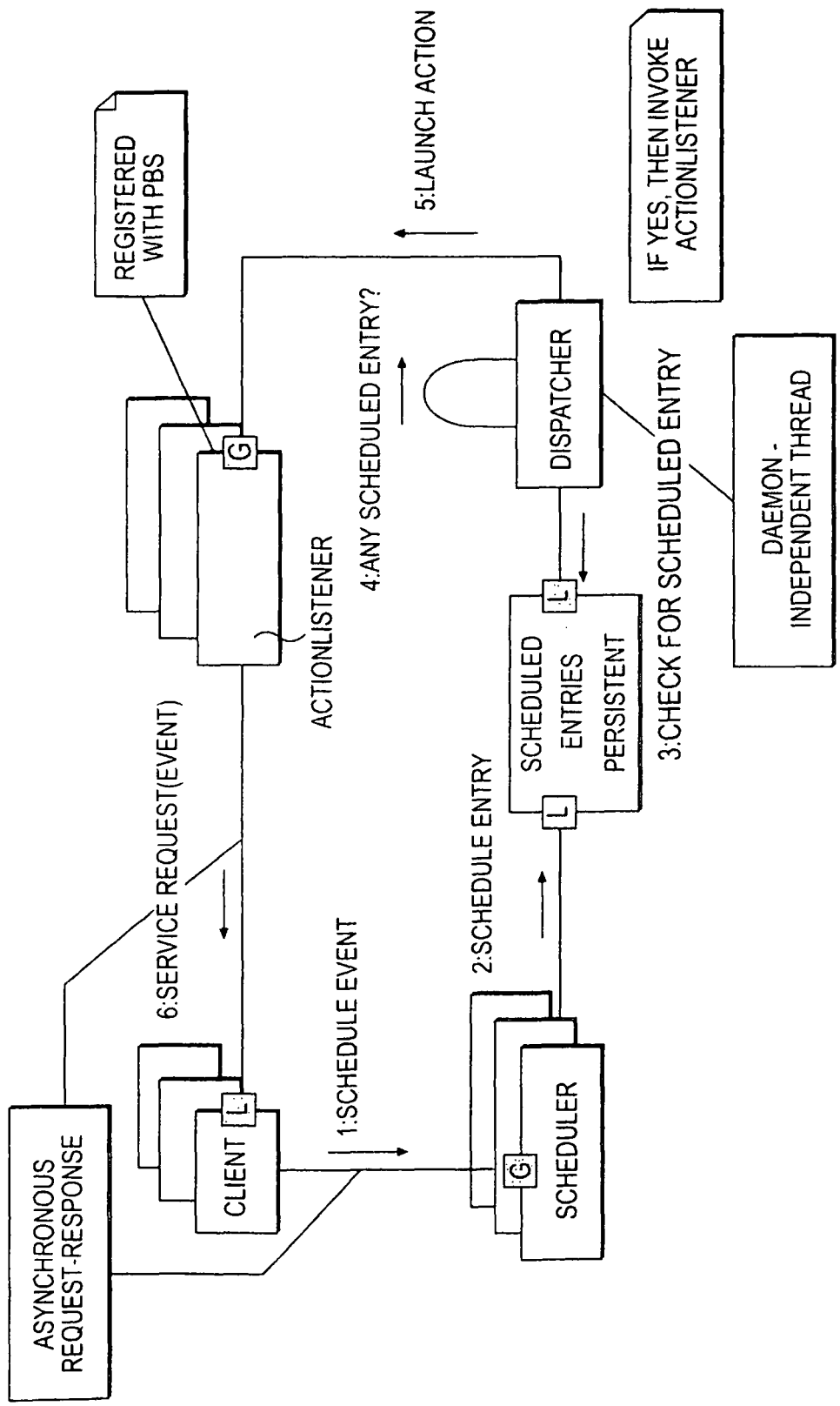
FIG. 8 is a flow diagram showing the Request-Response Collaboration for a Scheduled Event.

The PBS Scheduler collaborations are shown in FIG. 8. Clients, typically ADOC and associated controllers, schedule an event by making a request on the scheduler (action 1). The scheduler is globally visible to the client as a well-known entity (see visibility adornment on the transition in FIG. 8). This request is asynchronous in that the event is scheduled and the client is not blocked.

The scheduler commits the scheduled event (action 2), where the scheduled entries are persistent. The dispatcher, running as a separate thread of execution or daemon, periodically checks for entries to act upon (actions 3, 4). The "heart beat" of the dispatcher can be customized. The dispatcher launches the ActionListener registered for a particular scheduled event (action 5).

The PBS comes with a number of standard ActionListeners (210 in FIG. 2). There is also provision in the PBS Scheduler to have user-defined ActionListener. An ActionListener is an agent or a handler that upon notification performs service related tasks. The ActionListener makes the appropriate service request (action 6) to complete the asynchronous request-response cycle for a scheduled event.

The ADOC Archive provides a transitive closure mechanism for ADOCs. When an archive request is made, the ADOC, associated controllers, and object references are all serialized and persisted. The ADOC can then be revived through a restore request. The archive and restore requests can be made as commands from the controllers.

This feature is very useful as an ADOC represents a business transaction. Business processes may require archiving business transactions upon completion for non-repudiation purposes. This is also useful in the case of modeling process brokering for long-running transactions where the time scales can be weeks or months.

The BFM Base, shown in FIG. 2, includes the WebSphere Workflow Service (WWFS) 11, the WebSphere Messaging Service 12, and the Solution Management Service 13. The PBS uses all three services provided by the BFM Base.

The WWFS 11 provides JointFlow API (Application Program Interface) to access the workflow engine such as MQ Workflow. PBS invokes workflow commands, i.e., method invocations on WWFS, to launch a business process, claim an activity in a process, indicate completion of an activity, and enquire the status of either a process or an activity. The PBS associates ADOC instances with activities. This association is captured in the Activity-ADOC map (AA Map) 212. An ADOC instance can participate in multiple activities either within the same process instance or multiple process instances.

A new activity becomes available, as specified in the process definition, when the business process is updated in the workflow engine to indicate the completion of a prior activity. The availability of a new activity results in the update of the AA Map. The PBS then launches an Activity Controller for the ADOC instance associated with the activity. The Activity Controller brokers the collaborations ("business conversation") necessary to execute the activity. The Activity Controller issues workflow commands on WWFS 11 as part of the controller definition to claim the activity and to also indicate completion of the activity. A number of application-specific states are typically involved between the claim and complete events. The Activity Controller can engage humans as well as applications in the execution of the activity.

Figure 9:
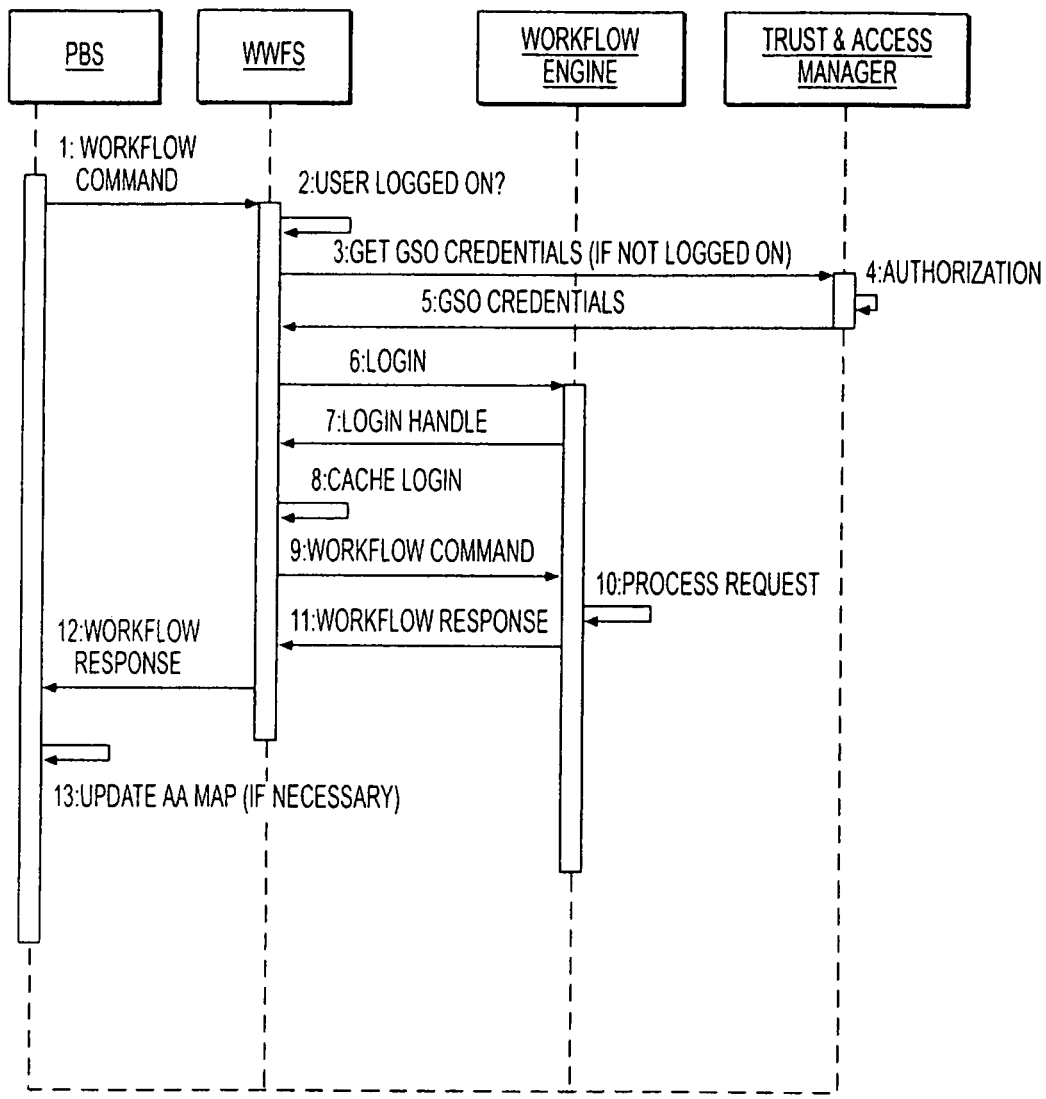
FIG. 9 is a time line diagram showing PBS and Workflow Interaction.

The interaction between the PBS and the Workflow Engine is shown in FIG. 9. The interaction sequences are as follows:

1. The PBS makes a workflow command. The controllers make this command typically.
2. The WWFS checks to see if the user has already logged on to the workflow engine. This is necessary especially for launching processes, claiming, and completing an activity since only users with certain privileges are authorized to perform such tasks.
3. If the user is not logged on to the workflow engine, the WWFS makes a request to the Trust & Access Manager (TAM), a WBI component, to obtain the Global Sign On credentials. A GSO is a mechanism to do credential mapping for a user with multiple identities associated with various back-end systems.
4. The TAM makes an authorization check to see if the user does have access to the requested system.
5. The TAM returns the authorization credentials to WWFS.
6. The WWFS uses the GSO credentials to logon to the workflow engine.
7. The workflow engine upon successful logon returns the logon connection handle.
8. The WWFS caches this logon handle for purposes of optimizing the connection to the workflow engine.
9. The WWFS then forwards the workflow command requested in action 1.
10. The workflow engine processes the request.
11. The workflow engine response is received by WWFS.
12. The WWFS forwards the workflow response back to the PBS
13. The PBS updates the AA Map if necessary—especially when the state of an activity changes.

The PBS utilizes the WebSphere Messaging Services 12, a BFM Base component (see FIG. 2), to receive and send messages. The messages are typically in XML format such as the OAG-BOD messages. The recommended transmission protocol is the JMS (Java Messaging Services); the MQPP (MQ Point-to-Point) protocol can also be used.

Figure 10:
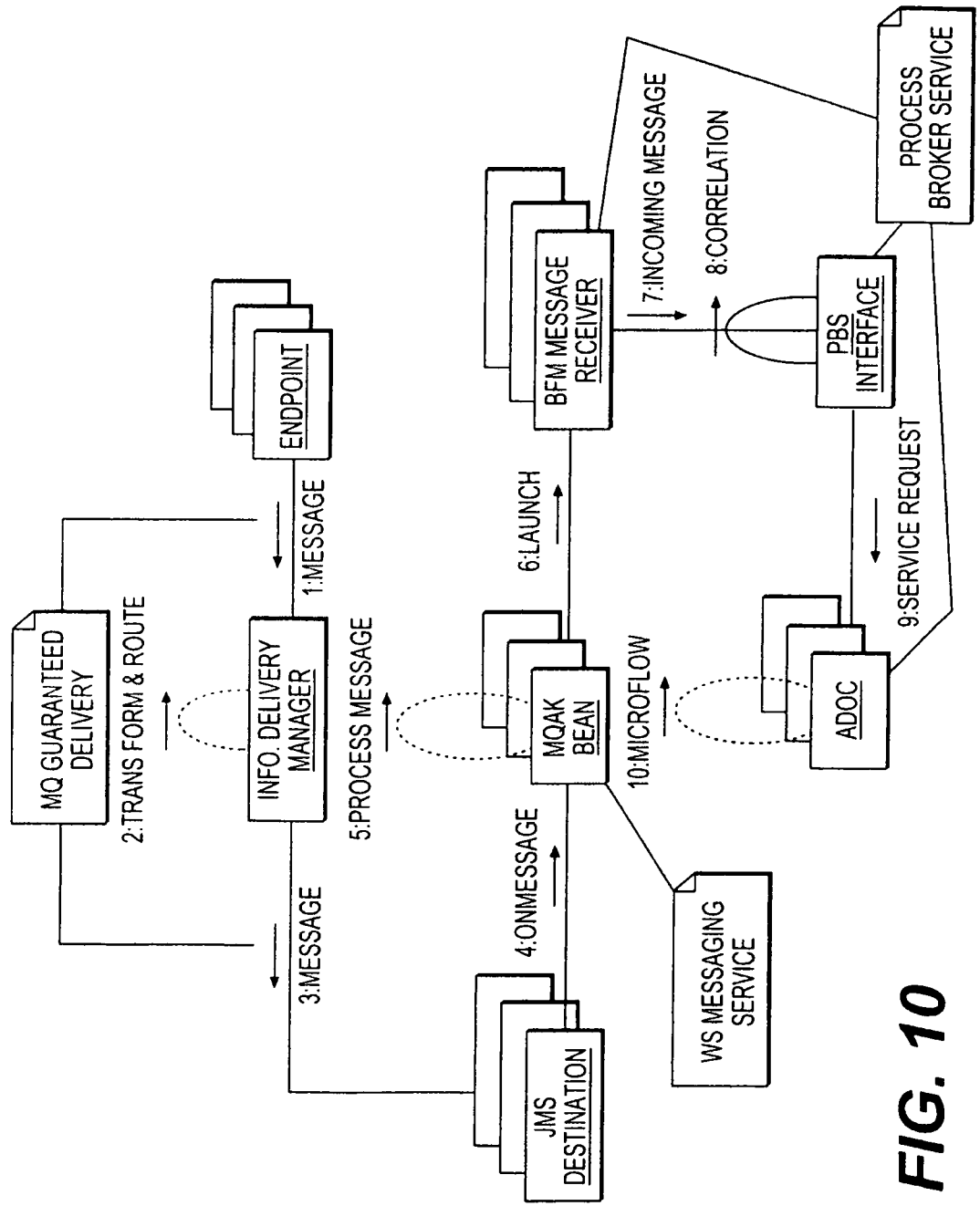
FIG. 10 is a flow diagram showing PBS messaging for an incoming message.

The collaborations associated with an incoming messaging are shown in FIG. 10.

1. Any end point, such as an ERP system or a scheduling application, sends a message. These messages are sent using MQ and hence guaranteed delivery. Typically, an MQ Adapter at the end-point semantically adapts the message from the application output to the canonical form such as OAG-BOD. The message is also enveloped with JMS and WBI headers.
2. The Information Delivery Manager, the message broker, receives the message, transforms it as necessary and routes the message. The source and the sink for the messages are essentially decoupled by IDM. This mechanism provides loose coupling and extensibility of the application integration.
3. Since the message is intended for the PBS it is routed to the JMS Destination. The JMS Destination can be either a specific queue (as in point-to-point messaging) or a topic (as in publish-subscribe messaging).
4. The MQ Adapter Kernel (MQAK) bean, that implements the JMS listener's onMessage method receives the message.
5. The MQAK bean processes the message, i.e., de-envelopes the JMS message header and formats it as necessary.
6. The MQAK bean then launches the BFM Message Receiver. The BFM Message Receiver is akin to a thin MQ Application Adapter that is designed to handle all incoming messages (of any type) to the PBS.

7. The BFM Message Receiver makes an incoming message call to the PBS Interface. This call also passes the message to the PBS Interface.
8. The PBS Interface does the necessary correlation. If an ADOC instance is referred to in the message header then that is used for correlation, otherwise a new ADOC instance is created and the message associated with the ADOC instance.
9. The PBS Interface makes a service request on the correlated ADOC. The PBS brokers the service-request appropriately to either the ADOC controller or one of many activity controllers.
10. The service request in turn triggers the appropriate controller state transition, resulting in the execution of a unit of work consisting of one or more commands or microflows within the controller.

The above collaboration illustrates how business data is communicated using messaging from any end point to the PBS. The PBS can also send business data as messages to any end point. This is accomplished using BFM microflows that format and compose the message and send the message using the MQAK. The BFM microflows that send messages are also built using the MQ Adapter Builder tool.

The BFM Solution Manager client 214 (see FIG. 2) in the PBS uses the Solution Management Services 13, a BFM Base component, to generate audit and exception logs that are persisted in the Solution Manager (WBI component). The audit and exception log messages are XML messages that are sent to the Solution Manager using MQ. The BFM SM Client can be invoked as a command within the ADOC and Activity Controllers in the PBS to initiate audit and exception logging. The PBS automatically logs the ADOC Transaction History.

The ADOC is a business entity that enables the execution of process driven business transactions (e.g., e-Payment ADOC). An e-Payment ADOC for example transcends the various steps in an e-Payment business process. Such an e-payment business process in turn engages multiple applications. From a solution management perspective it is important to be able to view the overall transaction history of the ADOC.

The ADOC controller manages 211 (FIG. 2) the state transitions. The controller upon receiving a valid event in a given state triggers a permissible state transition. The transition in turn launches one or more actions. These actions are sub-transactions against various back-ends. The ADOC Transaction History consists of a record of the states that the ADOC has traversed and the Time In and Time Out for each individual state in the traversed state list. The transaction history for an ADOC is uniquely associated with the ADOC ID that represents the transaction identifier. (Such a view of the transaction history is equivalent to tracking a package using the UPS tracking number it shows the various package states and marks the progress using time stamps.)

The Log message fields and mapping to the ADOC status, provided automatically by the BFM SM client, is shown below:

| Message Field | Values | Solution Manager Log Field | Description |
| --- | --- | --- | --- |
| SourceID | BFM App ID (e.g. BFM, BFM1, etc.) | MSG_SRC_ID | This is the WBI application name. |
| Body Category | ADOC | MSG_BDYCAT | This is the category of the log event |

-continued

| Message Field | Values | Solution Manager Log Field | Description |
| --- | --- | --- | --- |
| Body Type | "Entry, Exit" | MSG_BDYTYPE | This represents the type of event being logged for this category |
| Transaction ID | ADOC ID | MSG_XACTION_ID | This is the key for the entry. |
| Body Data | See next table | SRC_MSG | This is the remaining information for this category of event and it will have a DTD unique to this category. The body data is stored in this column as a blob. |

The message fields and values for the body data are shown below:

| Body Field | Values | Description |
| --- | --- | --- |
| ACTIVITYID | The Activity ID | Activity ID, if applicable |
| ADOCTYPE | The ADOC Type | The type of ADOC being logged such as "e-payment" |
| USERID | User ID | User ID, if available |
| EVENTNAME | "Trigger Event Name" | Name of the event that caused the transition. |
| DATETIME | Log Event Time | The log event time (Java Date) |
| FROMSTATE | ADOC State Name | The name of the prior state. |
| TOSTATE | ADOC State Names | The name of the next state. |

The following describes a sample application to demonstrate the use of Process Broker Services (PBS) layer in WebSphere Business Integrator. We begin with the description of the application, introduce a methodology to design the PBS artifacts needed to implement the solution, and derive the artifacts using this methodology.

We describe a Private Trading Exchange (PTX) that enables collaboration between the Trading Partners of a company and its employees in the context of order logistics management. The scenario follows the life cycle of an RFQ (Request for Quote), starting from creation, till the completion of the vendor selection. We present the application in three parts:

1. Information Model.
    This describes the underlying data structures the system will create, read, update, or delete and their relationships.
2. Organization Model.
    This organizes the users of the system by the business roles they play.
3. Business Process Model.
    This describes the business events that are received by the system as well as those that are generated by the system. For incoming events, the model will describe the business rules that should be applied for processing the events. For outgoing events, the model will describe the business rules that govern the generation of these events. We differentiate business events from "workflow events". All workflow events will be described as part of the business rules that generate or consume business events.

There are two primary data structures: The RFQ and the Quote. A realistic RFQ application would need many more supporting data structures, but we will not discuss these here since it is irrelevant from the process brokering point of view.

The organization model consists of the PTX organization and various seller organizations. The roles in the PTX organization include Buyer and Buyer-Approver. The roles in a typical seller organization include Seller and Seller-Approver.

Figure 11:
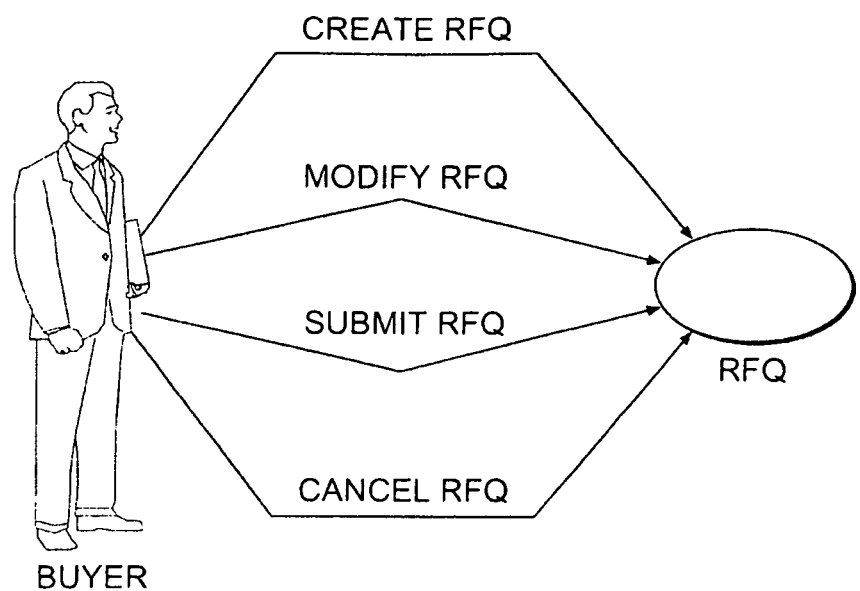
FIG. 11 is a flow diagram showing Business Events in an RFQ Process.

FIG. 11 shows the business events in the RFQ application. We do not discuss workflow events here, since those are part of the processing rules associated with the business events. An example of a workflow event is a Buyer-Approver acting on a submitted RFQ to approve or reject it. This event is captured as part of the business rules specified to process a submitted RFQ.

1. Business Event: Create RFQ
    Source: Buyer
    Preconditions: None
    Processing Rules: Persist RFQ data in 1 DB
2. Business Event: Modify RFQ
    Source: Buyer
    Preconditions: RFQ created but not submitted or cancelled.
    Processing Rules: Modify RFQ data in DB
3. Business Event: Submit RFQ
    Source: Buyer
    Preconditions: RFQ created, but not cancelled or submitted.
    Processing Rules: Start the "RFQ Process". The process is shown as a flow graph below:
4. Business Event: Cancel RFQ
    Source: Buyer.
    Preconditions: RFQ created.
    Processing Rules: If RFQ Process is active, terminate it. Notify sellers and approvers.

The key design artifact of a PBS-based solution is the ADOC. ADOCs provide the process brokering capability by intercepting business events and servicing them based on the application state. Thus, identifying the ADOCs in the application is the key step in solution design.

In order to apply the ADOC concept effectively, we provide a guideline to identify and define the ADOCs in a solution. It is important to note that ADOC is a complex design pattern and it does not follow a definitive path or a written recipe for making all the design choices. The following guideline serves only as a suggestion for how ADOCs can be identified in general:

Define all the relevant business objects in the business problem. The information model from the analysis phase will help in identifying the business objects.

Then look for those key business objects that can serve as the "handlers" of the business events identified in the business process model.

Typically there is a one-to-one correspondence between these key business objects and the ADocs in the solution.

Using the RFQ process in the Private Exchange as an example, all business events specified in the business process model are in the context of the RFQ business object. Thus we need only one ADOC type in this application, an RFQ ADOC that handles these business events.

Once the ADOCs are identified, the next step is to define them for the solution. By defining an ADOC, we are defining the collaborative behavior that ADOC encapsulates. The behavior of the ADOC is defined using a state machine combined with command design pattern. The state machine is defined as a set of finite states and the transitions permissible at each state. For each state transition, there is an associated event that triggers it. The state transitions are triggered by a service request made by some client on the ADOC. As part of the service request, the client passes an event identifier, a set of input parameters, and a context to the ADOC. As part of a state transition, the ADOC executes a set of commands as a transaction, The commands are designed using the Command Design Pattern, which implies the actual work is delegated to a receiver.

To define the state machine and ADOC, we begin with the business process model to identify the "business events" that are handled by this ADOC. These business events map to the events that drive the ADOC state transitions. The business rules that govern the processing of these events are used to identify the state transitions, the commands that need to be executed for each transition and the receivers of these commands.

In addition to the state machine that defines the behavior, an ADOC will also hold minimal state information. This includes the current state of the ADOC and pointers to the business, objects referenced by it. An ADOC only needs to reference the "top-level" business objects. There is no need for the ADOC to reference business objects navigable from the top-level business objects.

The following presents the design of the RFQ ADOC for the sample application. The RFQ ADOC Entity is used to hold the minimal state information and RFQ ADOC Controller is used to define the behavior.

Figure 13:
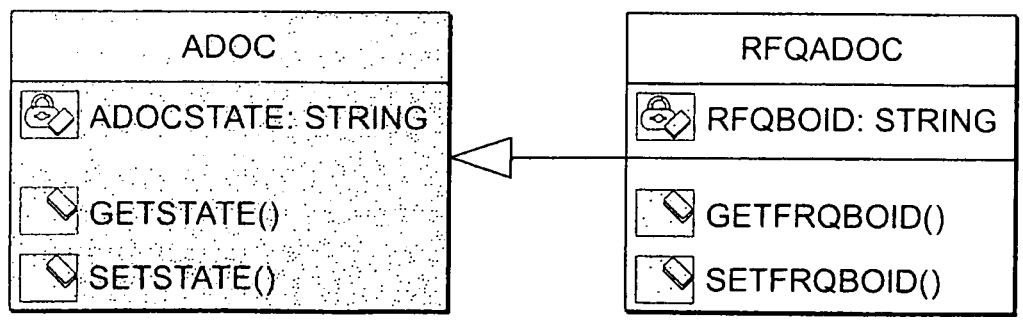
FIG. 13 is a block diagram showing an RFQ ADOC Entry.
Figure 12:
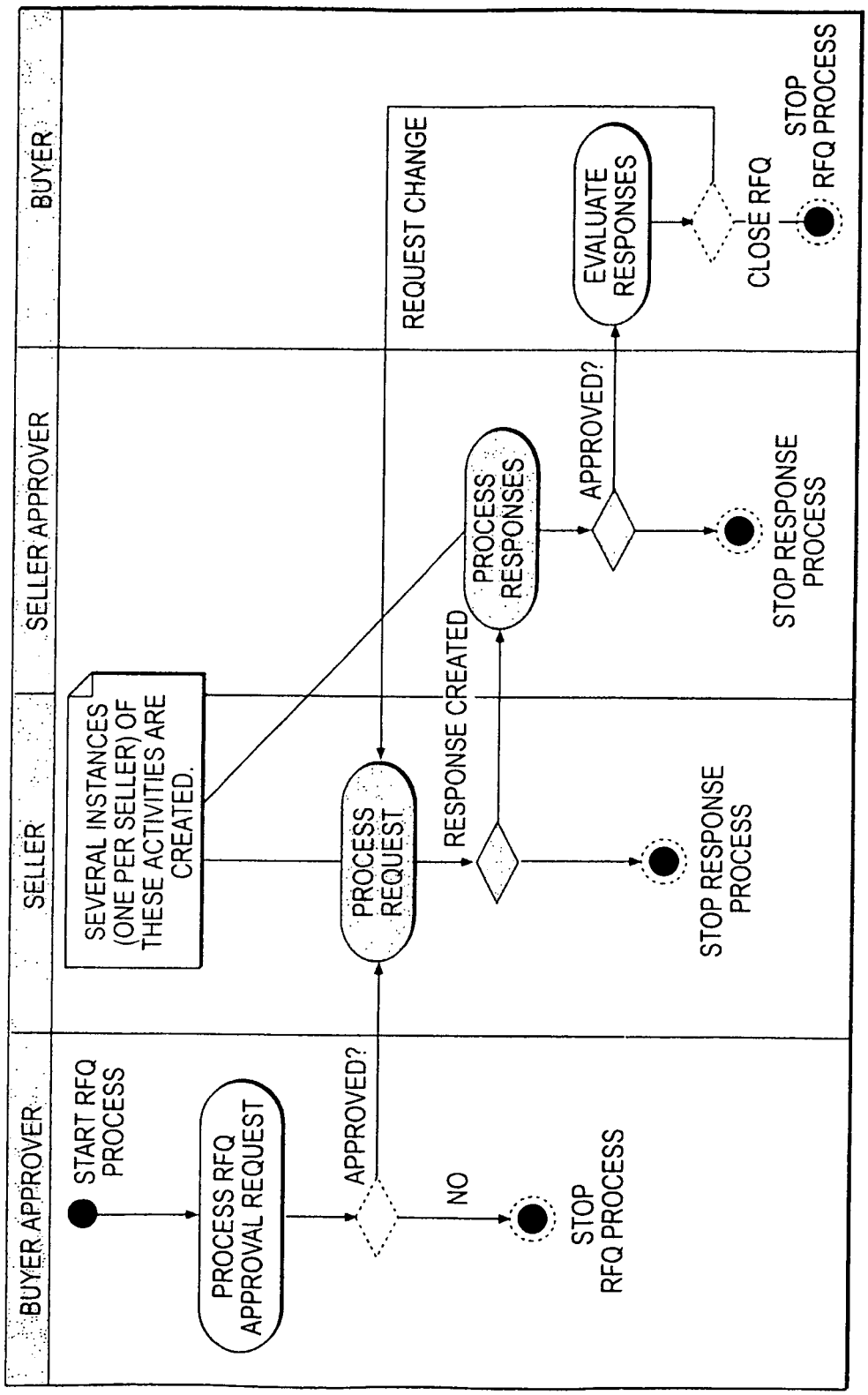
FIG. 12 is a time line and flow diagram showing the RFQ Process.

The design of the RFQ ADOC Entity is as shown below in FIG. 13. The RFQ ADOC Entity extends the generic ADOC class to hold application specific data references.

Figure 14:
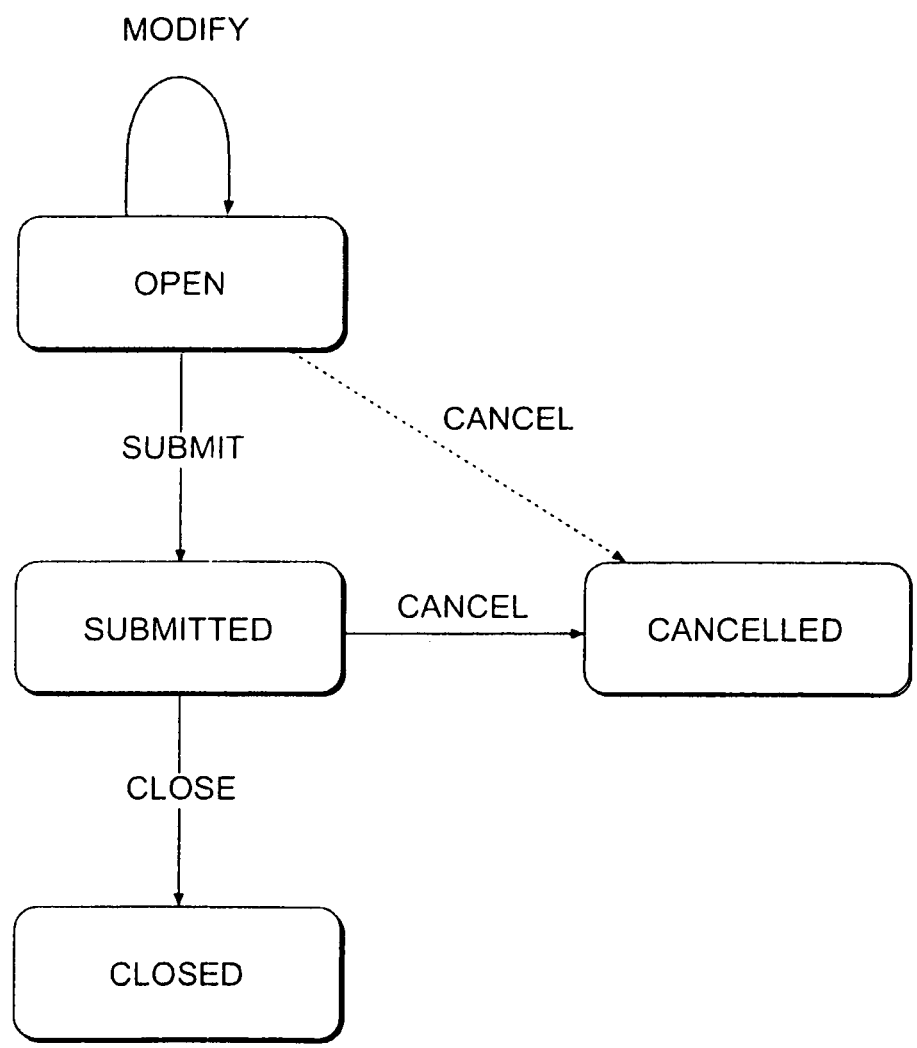
FIG. 14 is a state diagram showing the RFQ ADOC Controller State Machine.

FIG. 14 shows the state machine of the RFQ ADOC Controller. Note that the states "Cancelled" and "Closed" have no transitions defined for them. We denote "Cancelled" state as a "terminal state". RFQ ADOCs that are "Cancelled" will be periodically purged by the system management services of PBS. RFQ ADOCs that are "Closed" will be archived periodically by PBS as well.

The table below shows the "commands" that get executed as part of state transitions:

| From | To | Event | Commands |
| --- | --- | --- | --- |
| Open | Submitted | Submit | StartRFQProcess |
| Open | Cancelled | Cancel | DeleteRFQData |
| Open | Open | Modify | ModifyRFQData |
| Submitted | Closed | Close | CreateNotificationInfo |
|  |  |  | Notify |
|  |  |  | CreatePO |
|  |  |  | DeleteRFQData |
| Submitted | Cancelled | Cancel | TerminateAllProcesses |
|  |  |  | CreateNotificationInfo |
|  |  |  | Notify |
|  |  |  | DeleteRFQData |

The table below shows the details of the commands and the corresponding receivers. The system commands are shaded.

| Command | Receiver | Description |
| --- | --- | --- |
| StartRFQProcess | WWF Services | Instantiates and starts the flow graph shown in FIG. X |
| DeleteRFQData | RFQ BO | Release persistent storage associated with RFQ |
| ModifyRFQData | RFQ BO | Modify persistent RFQ data |
| CreateNotificationInfo | RFQ BO | Generate information on whom to notify and what to notify |

| | | |
|---|---|---|
| Notify | Notification BO | Send e-mail notifications based on information collected by the previous command |
| CreatePO | PBS Scheduler | Create PO ADOC and start PO business process asynchronously |
| TerminateAllProcesses | BPMAdmin | Terminate RFQ and Quote Creation processes. (Terminate all associated processes of an ADOC instance.) |

The processing rules specified for a business event may dictate that certain business events necessitate collaboration among the "agents" in the solution. The agents could be human role players or software agents working on behalf of human users. Typically, this collaboration entails a long running process that could span several days or even months. In a WBI solution, this collaboration is captured in a workflow graph. A workflow graph is a directed graph, where the nodes denote activities that are to be "completed" by designated agents and arcs denote the collaboration pattern.

Figure 15:
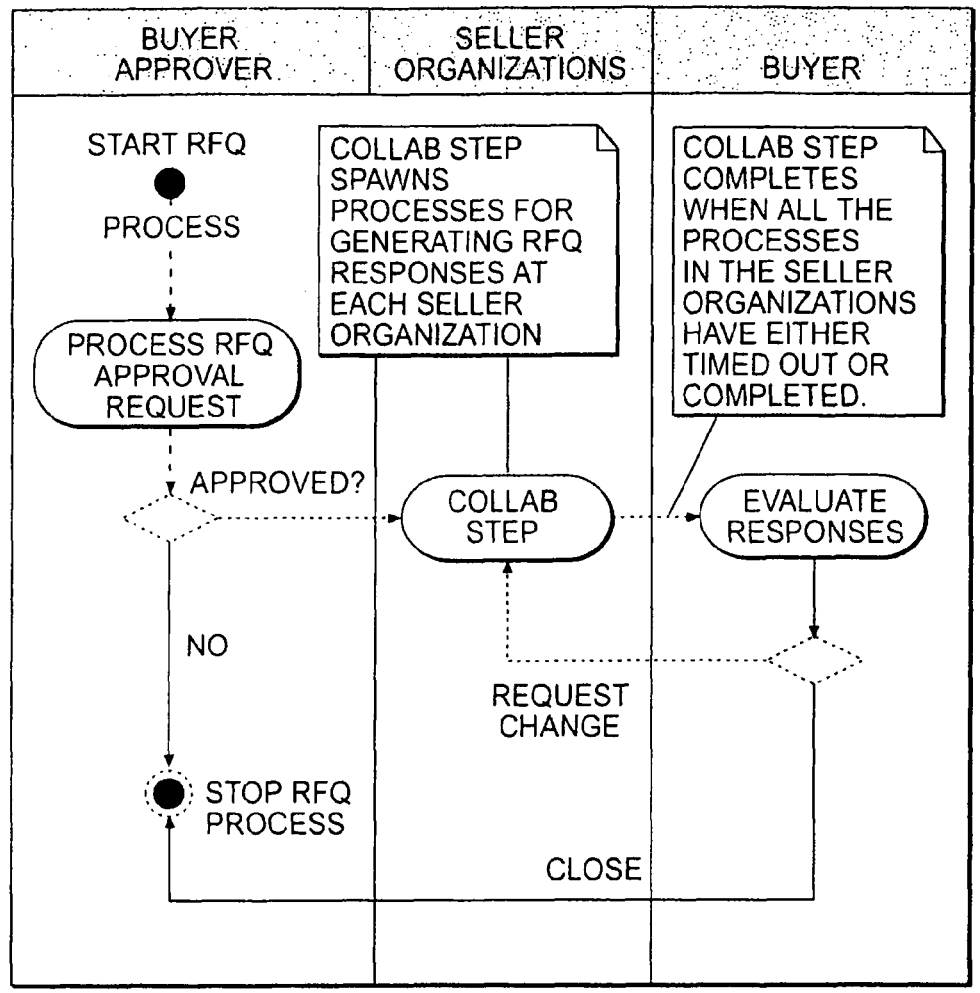
FIG. 15 is a time line and flow diagram of the Macro Flow for RFQ Processing.

Using the RFQ process in the Private Exchange as an example, the RFQ "submit" action by the Buyer necessitates collaboration between the Buyer-Approver, Buyer, and the Seller organizations. The workflow graph for this process is given in FIG. 15.

Micro workflow refers to the detailed activity flow within a macro activity. This is different from macro workflow in that it is composed of actions that are triggered by the agent who is doing the macro activity. These actions are typically transactional, synchronous, and short running. In a WBI solution, a micro workflow may be defined for any activity in the macro workflow graphs.

Micro workflow is implemented using exactly the same technology as the ADOCs. There is a Task Controller that implements the micro workflow associated with each activity. This Task Controller is designed using a state machine and the command design pattern just as an ADOC Controller is defined.

Typically, an ADOC controller initiates the macro workflow as a result of a state transition. When an activity becomes available in the macro flow, PBS launches a Task Controller to drive that task. When that activity is completed, the Task Controller ceases to exist and the process moves to the next step(s). When there are no more activities, the process completes.

Thus, the ADOC and Task controllers together drive the client interaction. It is quite conceivable that multiple activities are associated with an ADOC instance. In the RFQ example, while sellers are in the process of responding to an RFQ, there will be multiple activity controllers associated with the same RFQ ADOC, each activity controller corresponding to a seller process. This is discussed in more detail later in the solution design. The macro and micro workflow states together represent the process state. Ideally, the ADOC state is orthogonal to the process state. The power of the PBS programming model derives from this ability to model this orthogonal state space.

Figure 16:
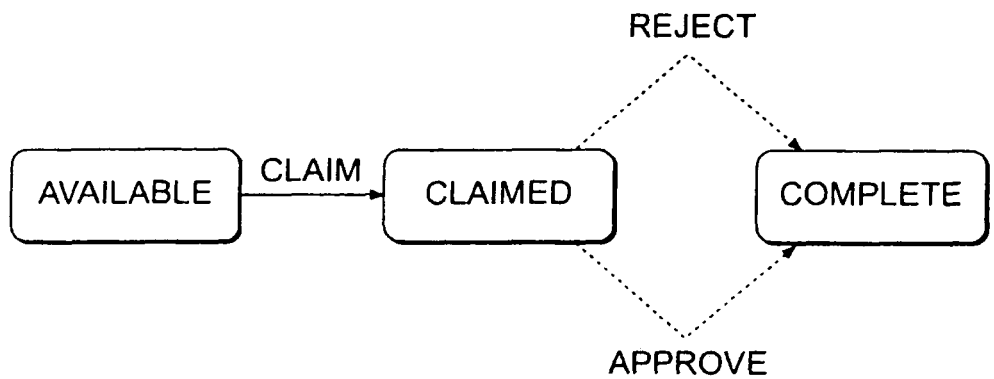
FIG. 16 is a state diagram showing the State Machine for the Process RFQ Approval Request Activity.

The activity controllers for the RFQ process are discussed below. FIG. 16 shows the "Process RFQ Approval Request" Activity Controller. The table below shows the state machine behavior:

| From | To | Event | Guard | Commands |
|---|---|---|---|---|
| Available | Claimed | Claim | | WFActivityClaim |
| Claimed | Complete | Approve | | WFActivityComplete CreateVendorList |
| Claimed | Complete | Reject | | WFActivityComplete DeleteRFQData CreateNotificationInfo Notify |

Figure 17:
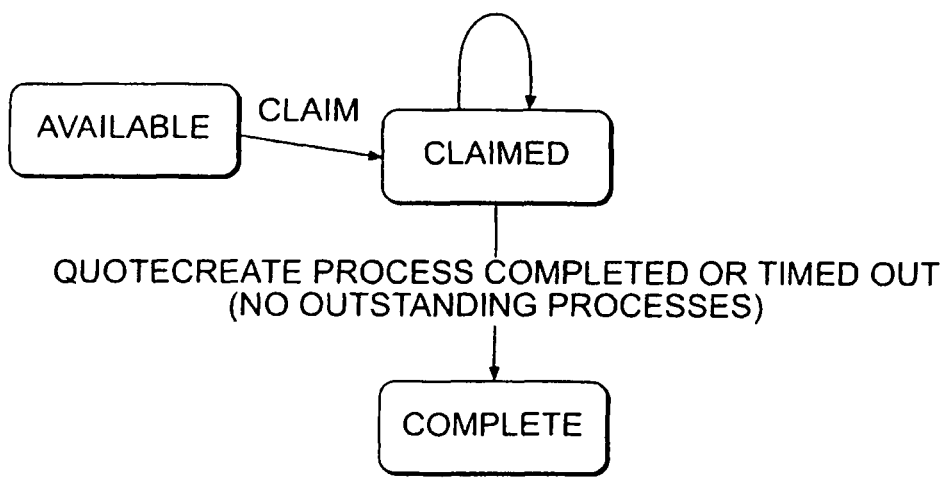
FIG. 17 is a state diagram showing the Collab Step Activity Controller State Machine.

FIG. 17 shows the Activity Controller for the "Collab Step" activity in the macro flow for RFQ processing. This step involves multiple child processes being created, one for each vendor organization, to enable the selected vendors to respond to the RFQ using the Private Exchange portal. The table below shows the state machine behavior:

| From | To | Event | Guard | Commands |
|---|---|---|---|---|
| Available | Claimed | Claim | | WFActivityClaim GenerateDynamicFanoutInfo SpawnChildProcessesAndTimers |
| Claimed | Claimed | Quote Create Process Completion or Timeout | Outstanding Process | UpdateProcessStatusInfo |
| Claimed | Complete | Quote Create Process Completion or Timeout | No Outstanding Processes | DeleteProcessStatusInfo |

Figure 18:
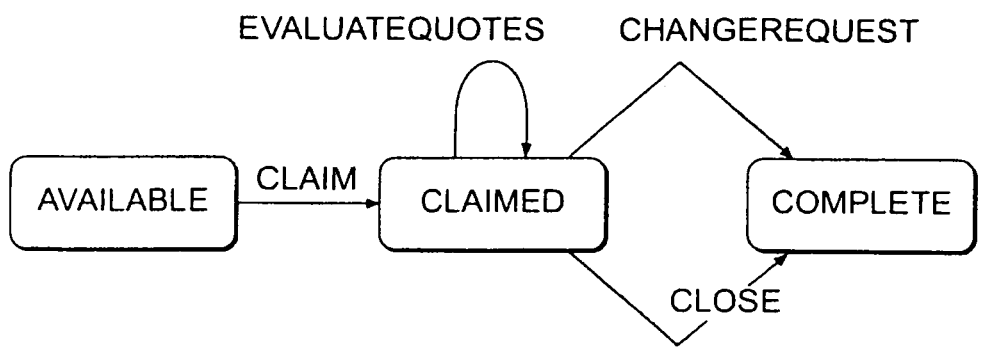
FIG. 18 is a state diagram showing the State Machine for the "Evaluate Response" Activity Controller.

FIG. 18 shows the activity controller for the "Evaluate Responses" step. The table below shows the state machine behavior:

| From | To | Event | Guard | Commands |
|---|---|---|---|---|
| Available | Claimed | Claim | | WFActivityClaim |
| Claimed | Claimed | Evaluate | | EvaluateQuotes |
| Claimed | Complete | RequestChange | | WFActivityComplete UpdateVendorList |
| Claimed | Complete | Close | | WFActivityComplete |

Note that the event "Close" is defined for the RFQ ADOC Controller as well as the "Evaluate Responses" Activity Controller. When a client invokes a service request with this event on an RFQ ADOC in the "submitted" state and in the context of a buyer evaluating the RFQ responses, this event will be sent to both controllers. The RFQ ADOC Controller will invoke commands that notify the sellers of the decision, send a "CreatePO" message to the PBS, and delete the RFQ data from the database. The Activity Controller will then complete the activity. Note that for PBS to be able to handle the "CreatePO" message, we need to populate the PBS with the PO (Purchase Order) process, much like the RFQ process described here.

The table below shows the details of the commands, including the receivers. The system commands are shaded.

| From | To | Event | Guard | Commands |
|------|-----|-------|-------|----------|
| Available | Claimed | Claim | | WFActivityClaim |
| Claimed | Complete | Approve | | WFActivityComplete |
| Claimed | Complete | Reject | | RemoveQuote |
| | | | | WFActivityComplete |

| Command | Receiver | Description |
|---------|----------|-------------|
| SpawnChildProcessesAndTimers | BFMAdmin | This command spawns instances of the macro flow in FIG. 9, one for each vendor. It also starts a timer for each process. |
| WFActivityClaim | WWF Services | Claim a workflow activity. |
| GenerateDynamicFanoutInfo | RFQ BO | Create XML string containing information on child proecesses to be spawned. |
| UpdateProcessStatusInfo | BFMAdmin | Update the completion status of child processes. |
| DeleteProcessStatusInfo | BFMAdmin | Delete the completion status table. |
| WFActivityComplete | WWF Services | Complete workflow activity. |
| CreateVendorList | RFQ BO | Create a vendor list from this RFQ. |
| DeleteRFQData | RFQ BO | Delete RFQ data from database. |
| CreateNotificationInfo | RFQ BO | Generate information on whom to notify and what to notify. |
| Notify | Notification HO | Send e-mail notifications. |
| UpdateVendorList | RFQ BO | Update vendor list for this RFQ. |
| EvaluateQuotes | RFQ BO | Evaluate all quotes for this RFQ. |

Figure 19:
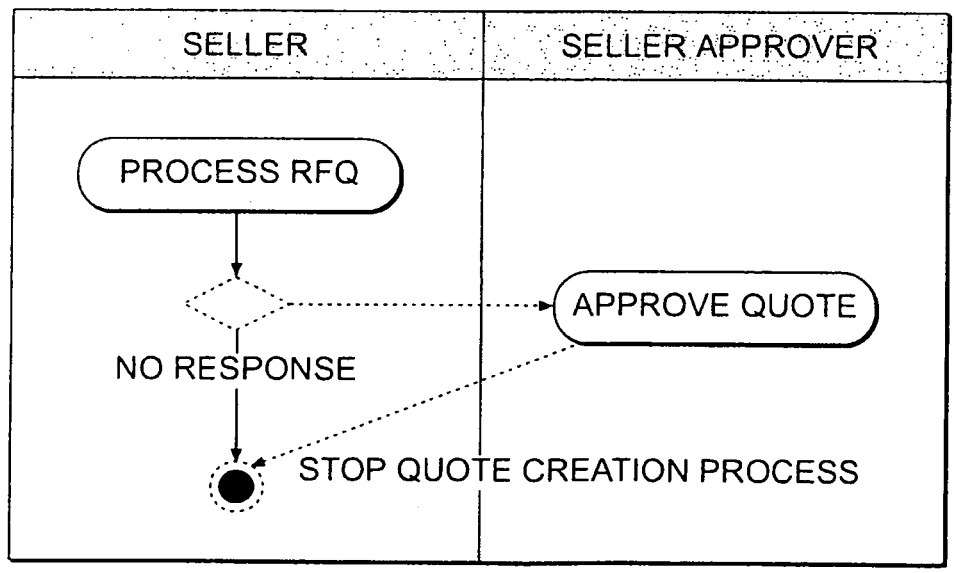
FIG. 19 is a time line and flow diagram of the Micro Flow for quote creation.
Figure 20:
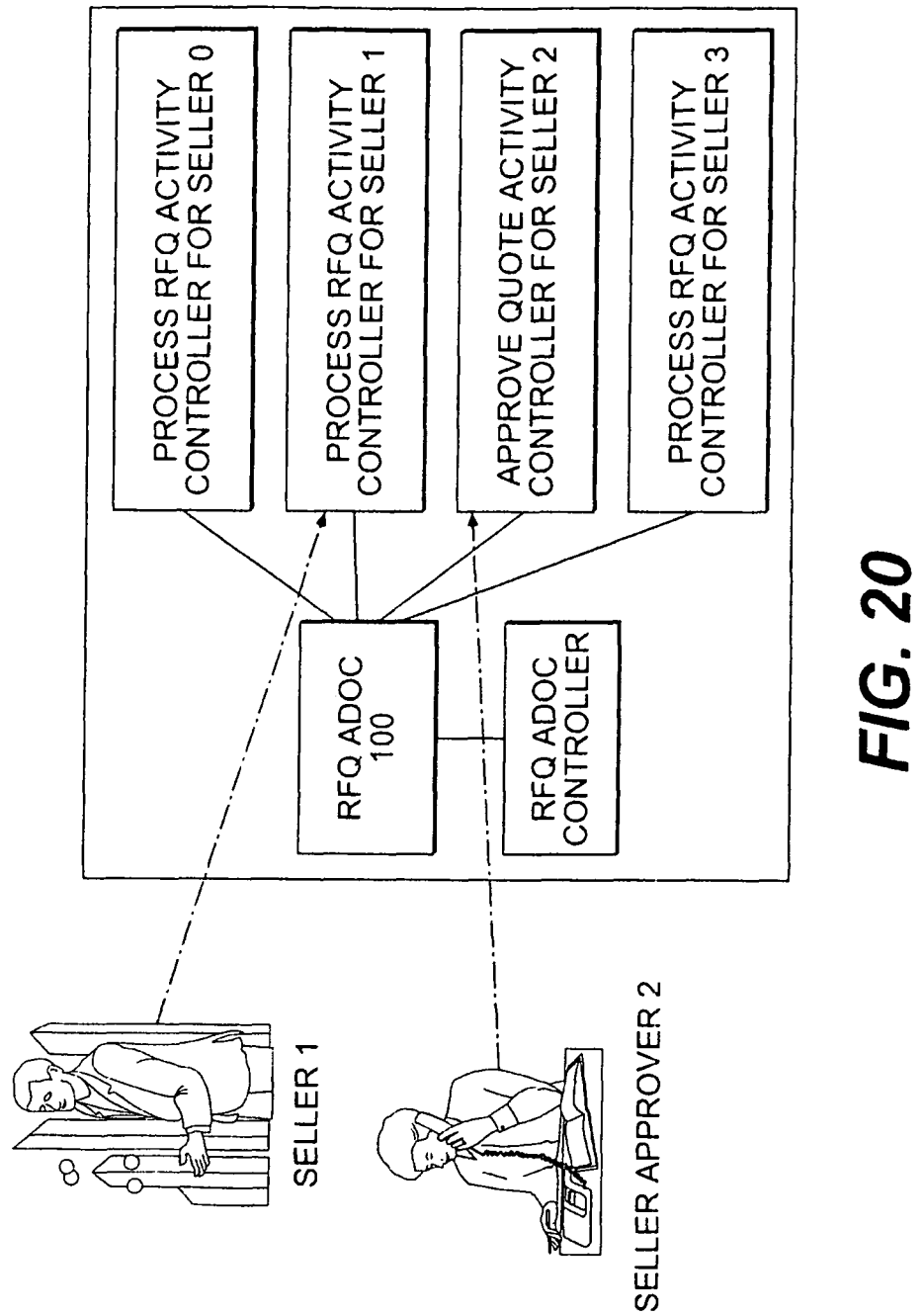
FIG. 20 is a block diagram illustrating multiple clients working with an ADOC with multiple activity controllers.

The following describes the macro and micro flows in quote creation process. FIG. 19 shows the macro flow for the quote creation process. Several instances of this macro flow are created, one for each vendor. It is assumed that all vendors use the Private Exchange portal to create responses. This could create a situation where multiple Activity Controllers are associated with an ADOC instance. Since a workflow activity can only be acted upon by a predefined set of users, the client can get a handle of the appropriate activity controller by specifying the user id and role information. Multiple clients could thus work with this ADOC with each client request being handled by the appropriate activity controller. FIG. 20 shows a scenario in which two seller organizations are working with an RFQ ADOC, the first one in the "Process RFQ" activity while the second one is one step ahead, in the "Approve Quote" activity.

Figure 21:
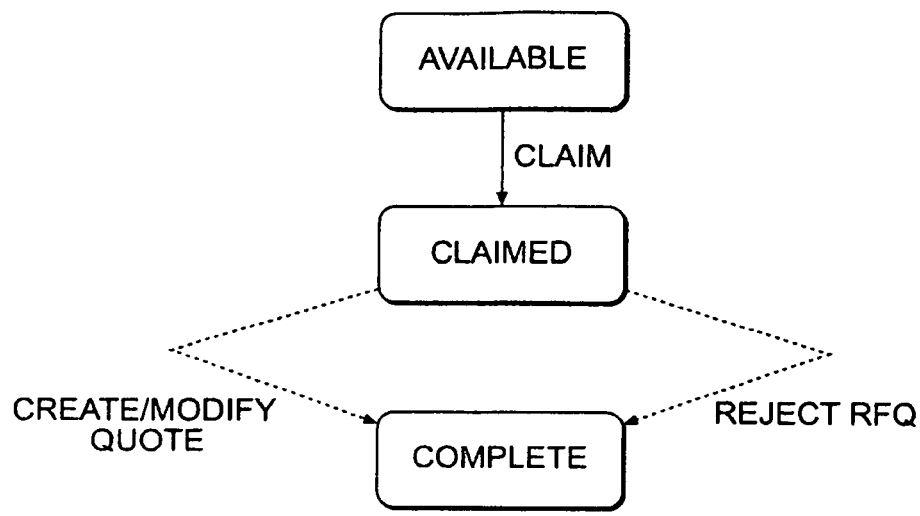
FIG. 21 is a state diagram showing the State Machine for the Activity Controller for the "Process RFQ" step.

Below we describe the activity controllers for the two nodes in the macro flow. FIG. 21 shows the activity controller for the "Process RFQ" step. The table below shows the state machine behavior:

| From | To | Event | Guard | Commands |
|------|-----|-------|-------|----------|
| Available | Claimed | Claim | | WFActivityClaim |
| Claimed | Complete | Create/Modify Quote | | Create/UpdateQuote |
| | | | | WFActivityComplete |
| Claimed | Complete | Reject | | WFActivityComplete |

Figure 22:
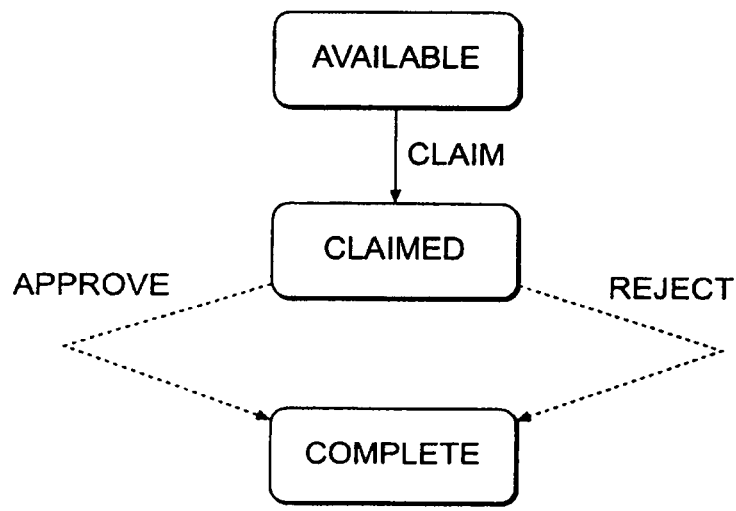
FIG. 22 is a state diagram showing State Machine for the "Approve Quote" step.

FIG. 22 shows the "Approve Quote" activity controller. The table below shows the state machine behavior:

The table below shows the details of the commands and receivers. The system commands are shaded.

| Command | Receiver | Description |
|---------|----------|-------------|
| WFActivityClaim | WWF Services | Claim a workflow activity. |
| WFActivityComplete | WWF Services | Complete a workflow activity. |
| Create/UpdateQuote | RFQ BO | Create/update a quote |
| RemoveQuote | RFQ BO | Remove a quote |

Figure 23:
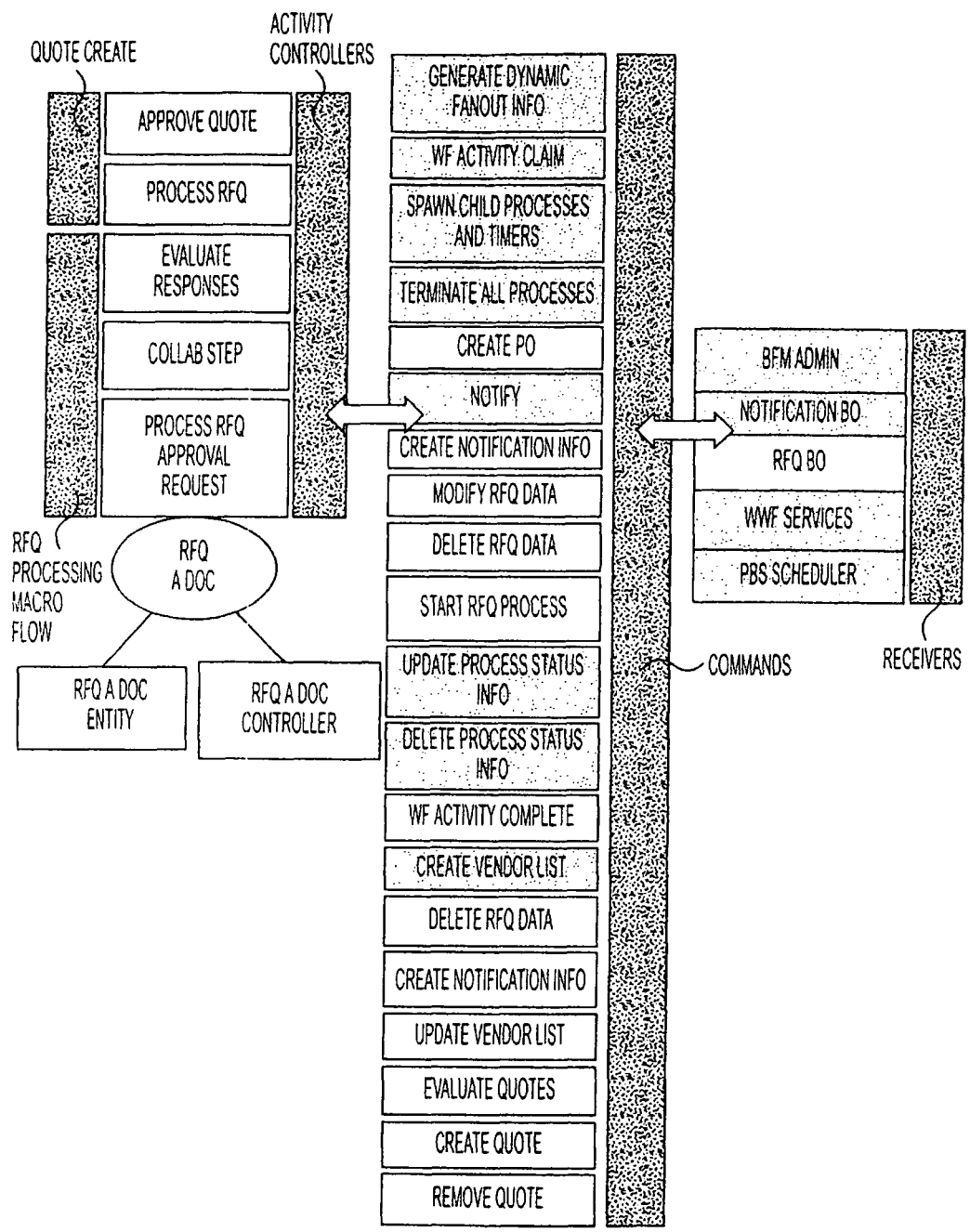
FIG. 23 is a block diagram illustrating solution artifacts for the RFQ Solution.

FIG. 23 shows the solution artifacts for the RFQ solution. All of the controllers, macro flows, and the commands are either scripted or composed graphically. RFQ ADOC Entity EJB and the RFQ BO EJB are the only components that need to be developed, and this is done using Visual Age for Java. All components shown shaded are part of the Process Broker Services.

We have not included legacy application integration via MQ adapters in this example. An MQAO source adapter can serve as a receiver for message-based integration with back-end applications.

There are two ways to send business events to the PBS, (1) by synchronous method invocation over IIOP or via (2) asynchronous messaging through the JMS Listener. The solution design remains the same irrespective of the protocol used.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method carried out by a computer system for designing a business process management system for process brokering and content aggregation in collaborative e-commerce comprising the steps of:

establishing an information model, an organization model, and a business process model in the computer system, wherein the information model characterizes underlying data structures used by the business process management system, the organization model organizes users of the business process management system according to corresponding business roles, and the business process model characterizes business events received or generated by the business process management system;

from the information model and the business process model, selecting Adaptive Documents (ADOCs) in the business process management system using the computer system, wherein an ADOC links content aggregated from various data sources to business processes and the users, and dynamically exposes a set of business services to a given one of the users based on a role of the given user and a process context, and a Process Broker Services interface redirects a business event from a client to an ADOC, and an ADOC controller acts on the business event based on a state of the business event and a content of the business event;

based on business events and prerequisites of the business events, designing ADOC state machines using the computer system;

based on processing rules associated with the business events, selecting commands that need to be executed as part of state transitions using the computer system;

when processing rules dictate collaboration with user or software agents in the business process management system, establishing macro flows using the computer system, wherein the macro flows are directed graphs that establish relationships between activities of the agents that correspond to nodes in the directed graphs; and defining, using activity controllers in the computer system, micro flow used to complete the activities that correspond to nodes in the directed graphs, with a state machine modeling behavior of the activity controllers and commands effecting behavior of the activity controllers.

2. The method of claim 1, comprising establishing an ADOC that has a changeable business state which is a state vector that includes a current state of the ADOC controller and a current state of each of the activity controllers.

3. The method of claim 1, including, for each command of the commands, establishing a receiver, including establishing a set of workflow-related receivers.

4. The method of claim 1, including implementing the ADOCs as Container-Managed Enterprise Java Beans.

5. A method carried out by a computer system for designing a business process management system for process brokering and content aggregation in collaborative e-commerce comprising the steps of:

establishing an information model, an organization model, and a business process model in the computer system, wherein the information model characterizes underlying data structures used by the business process management system, the organization model organizes users of the business process management system according to corresponding business roles, and the business process model characterizes business events received or generated by the business process management system;

from the information model and the business process model, selecting Adaptive Documents (ADOCs) in the business process management system using the computer system, wherein an ADOC links content aggregated from various data sources to business processes and the users, and dynamically exposes a set of business services to a given one of the users based on a role of the given user and a process context, and each ADOC is implemented through a framework part and a solution part, wherein the framework part persists information including a current state of the ADOC, an owner of the ADOC and a type of the ADOC, and the solution part inherits from the framework part and persists business object references to data objects;

based on business events and prerequisites of the business events, designing ADOC state machines using the computer system;

based on processing rules associated with the business events, selecting commands that need to be executed as part of state transitions using the computer system;

when processing rules dictate collaboration with user or software agents in the business process management system, establishing macro flows using the computer system, wherein the macro flows are directed graphs that establish relationships between activities of the agents that correspond to nodes in the directed graphs; and defining, using activity controllers in the computer system, micro flow used to complete the activities that correspond to nodes in the directed graphs, with a state machine modeling behavior of the activity controllers and commands effecting behavior of the activity controllers.

* * * * *